US012610044B2

(12) United States Patent
van der Schaar

(10) Patent No.: US 12,610,044 B2
(45) Date of Patent: Apr. 21, 2026

(54) SYSTEMS AND METHODS FOR ENCODING ALTERNATIVE STREAMS OF VIDEO FOR USE IN ADAPTIVE BITRATE STREAMING

(71) Applicant: DIVX, LLC, San Diego, CA (US)

(72) Inventor: Auke Sjoerd van der Schaar, London (GB)

(73) Assignee: DIVX, LLC, San Diego, CA (US)

( * ) Notice: Subject to any disclaimer, the term of this patent is extended or adjusted under 35 U.S.C. 154(b) by 106 days.

(21) Appl. No.: 18/172,188

(22) Filed: Feb. 21, 2023

(65) Prior Publication Data

US 2023/0209049 A1 Jun. 29, 2023

Related U.S. Application Data

(63) Continuation of application No. 16/931,287, filed on Jul. 16, 2020, now abandoned, which is a (Continued)

(51) Int. Cl.
*H04N 19/115* (2014.01)
*H04N 19/156* (2014.01)
(Continued)

(52) U.S. Cl.
CPC ......... *H04N 19/115* (2014.11); *H04N 19/156* (2014.11); *H04N 19/187* (2014.11);
(Continued)

(58) Field of Classification Search
CPC .. H04N 19/115; H04N 19/156; H04N 19/187; H04N 19/30; H04N 21/23439;
(Continued)

(56) References Cited

U.S. PATENT DOCUMENTS 3,609,227 A 9/1971 Kuljian
4,694,491 A 9/1987 Horne et al.
(Continued)

FOREIGN PATENT DOCUMENTS

CA 2237293 A1 7/1997
EP 1158799 A1 11/2001
(Continued)

OTHER PUBLICATIONS

Extended European Search Report for European Application 11854998.9, Report Completed Apr. 30, 2015, Mailed May 8, 2015, 11 Pgs.
(Continued)

*Primary Examiner* — Joseph W Becker
(74) *Attorney, Agent, or Firm* — KPPB LLP

(57) ABSTRACT

Systems and methods for encoding alternative streams for use in adaptive bitrate streaming based upon the delay of each stream in accordance with embodiments of the invention are described. One embodiment of the invention includes memory, and a processor configured by a source encoding application to: receive multimedia content, where the multimedia content includes source video data having a primary resolution and a primary sample aspect ratio; and encode the source video data as a set of alternative video streams, where: the alternative video streams have different maximum bitrates; and the alternative video streams are encoded to have an upper bound seek delay that is equal to or less than the upper bound seek delay of streams in the set of alternative video streams that are encoded at a higher maximum bitrate.

34 Claims, 7 Drawing Sheets

Related U.S. Application Data continuation of application No. 16/443,254, filed on Jun. 17, 2019, now Pat. No. 10,764,579, which is a continuation of application No. 15/453,714, filed on Mar. 8, 2017, now Pat. No. 10,326,987, which is a continuation of application No. 14/696,035, filed on Apr. 24, 2015, now Pat. No. 9,667,967, which is a continuation of application No. 13/341,504, filed on Dec. 30, 2011, now Pat. No. 9,020,039.

(60) Provisional application No. 61/430,502, filed on Jan. 6, 2011.

(51) Int. Cl.

| | |
|---|---|
| *H04N 19/187* | (2014.01) |
| *H04N 19/30* | (2014.01) |
| *H04N 19/70* | (2014.01) |
| *H04N 21/2343* | (2011.01) |
| *H04N 21/262* | (2011.01) |
| *H04N 21/6379* | (2011.01) |
| *H04N 21/845* | (2011.01) |

(52) U.S. Cl.
CPC ....... *H04N 19/30* (2014.11); *H04N 21/23439* (2013.01); *H04N 21/26258* (2013.01); *H04N 21/6379* (2013.01); *H04N 21/8456* (2013.01); *H04N 19/70* (2014.11)

(58) Field of Classification Search
CPC ......... H04N 21/26258; H04N 21/6379; H04N 21/8456; H04N 19/70; G06F 15/16
See application file for complete search history.

(56) References Cited

U.S. PATENT DOCUMENTS

| | | | |
|---|---|---|---|
| 5,132,992 A | 7/1992 | Yurt et al. |
| 5,341,474 A | 8/1994 | Gelman et al. |
| 5,400,401 A | 3/1995 | Wasilewski et al. |
| 5,477,263 A | 12/1995 | Ocallaghan et al. |
| 5,544,318 A | 8/1996 | Schmitz et al. |
| 5,550,863 A | 8/1996 | Yurt et al. |
| 5,574,785 A | 11/1996 | Ueno et al. |
| 5,600,721 A | 2/1997 | Kitazato |
| 5,614,940 A | 3/1997 | Cobbley et al. |
| 5,621,794 A | 4/1997 | Matsuda et al. |
| 5,630,005 A | 5/1997 | Ort |
| 5,642,338 A | 6/1997 | Fukushima et al. |
| 5,761,417 A | 6/1998 | Henley et al. |
| 5,805,700 A | 9/1998 | Nardone et al. |
| 5,813,010 A | 9/1998 | Kurano et al. |
| 5,828,370 A | 10/1998 | Moeller et al. |
| 5,838,791 A | 11/1998 | Torii et al. |
| 5,852,664 A | 12/1998 | Iverson et al. |
| 5,854,873 A | 12/1998 | Mori et al. |
| 5,874,986 A | 2/1999 | Gibbon et al. |
| 5,878,135 A | 3/1999 | Blatter et al. |
| 5,892,915 A | 4/1999 | Duso et al. |
| 5,907,658 A | 5/1999 | Murase et al. |
| 5,907,688 A | 5/1999 | Hauck et al. |
| 5,923,869 A | 7/1999 | Kashiwagi et al. |
| 5,973,679 A | 10/1999 | Abbott et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,038,316 A | 3/2000 | Dwork et al. |
| 6,057,832 A | 5/2000 | Lev et al. |
| 6,065,050 A | 5/2000 | DeMoney |
| 6,108,422 A | 8/2000 | Newby et al. |
| 6,151,634 A | 11/2000 | Glaser et al. |
| 6,199,107 B1 | 3/2001 | Dujari |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,347,145 B2 | 2/2002 | Kato et al. |
| 6,351,538 B1 | 2/2002 | Uz |
| 6,373,803 B2 | 4/2002 | Ando et al. |
| 6,389,473 B1 | 5/2002 | Carmel et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,516,064 B1 | 2/2003 | Osawa et al. |
| 6,535,920 B1 | 3/2003 | Parry et al. |
| 6,578,200 B1 | 6/2003 | Takao et al. |
| 6,594,699 B1 | 7/2003 | Sahai et al. |
| 6,654,933 B1 | 11/2003 | Abbott et al. |
| 6,671,408 B1 | 12/2003 | Kaku |
| 6,690,838 B2 | 2/2004 | Zhou |
| 6,721,794 B2 | 4/2004 | Taylor et al. |
| 6,724,944 B1 | 4/2004 | Kalevo et al. |
| 6,742,082 B1 | 5/2004 | Lango et al. |
| 6,751,623 B1 | 6/2004 | Basso et al. |
| 6,810,131 B2 | 10/2004 | Nakagawa et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,531 B1 | 8/2005 | Takahashi |
| 6,931,543 B1 | 8/2005 | Pang et al. |
| 6,957,350 B1 | 10/2005 | Demos |
| 6,965,646 B1 | 11/2005 | Firestone |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,023,992 B1 | 4/2006 | Kubota et al. |
| 7,043,021 B2 | 5/2006 | Graunke et al. |
| 7,051,110 B2 | 5/2006 | Hagai et al. |
| 7,058,177 B1 | 6/2006 | Trimberger et al. |
| 7,073,191 B2 | 7/2006 | Srikantan et al. |
| 7,110,542 B1 | 9/2006 | Tripathy |
| 7,120,250 B2 | 10/2006 | Candelore |
| 7,124,303 B2 | 10/2006 | Candelore et al. |
| 7,139,868 B2 | 11/2006 | Parry et al. |
| 7,143,289 B2 | 11/2006 | Denning et al. |
| 7,151,832 B1 | 12/2006 | Fetkovich et al. |
| 7,167,560 B2 | 1/2007 | Yu |
| 7,188,183 B1 | 3/2007 | Paul et al. |
| 7,203,313 B2 | 4/2007 | England et al. |
| 7,212,726 B2 | 5/2007 | Zetts |
| 7,231,516 B1 | 6/2007 | Sparrell et al. |
| 7,233,669 B2 | 6/2007 | Candelore |
| 7,233,948 B2 | 6/2007 | Shamoon et al. |
| 7,242,772 B1 | 7/2007 | Tehranchi |
| 7,274,861 B2 | 9/2007 | Yahata et al. |
| 7,295,673 B2 | 11/2007 | Grab et al. |
| 7,302,490 B1 | 11/2007 | Gupta et al. |
| 7,315,829 B1 | 1/2008 | Tagawa et al. |
| 7,346,163 B2 | 3/2008 | Pedlow, Jr. et al. |
| 7,349,886 B2 | 3/2008 | Morten et al. |
| 7,349,976 B1 | 3/2008 | Glaser et al. |
| 7,352,956 B1 | 4/2008 | Winter et al. |
| 7,363,647 B1 | 4/2008 | Fakharzadeh |
| 7,376,233 B2 | 5/2008 | Candelore et al. |
| 7,382,879 B1 | 6/2008 | Miller |
| 7,397,853 B2 | 7/2008 | Kwon et al. |
| 7,400,679 B2 | 7/2008 | Kwon et al. |
| 7,406,176 B2 | 7/2008 | Zhu et al. |
| 7,418,132 B2 | 8/2008 | Hoshuyama |
| 7,443,449 B2 | 10/2008 | Momosaki et al. |
| 7,457,415 B2 | 11/2008 | Reitmeier et al. |
| 7,499,930 B2 | 3/2009 | Naka et al. |
| 7,539,213 B2 | 5/2009 | Guillemot et al. |
| 7,546,641 B2 | 6/2009 | Robert et al. |
| 7,577,980 B2 | 8/2009 | Kienzle et al. |
| 7,623,759 B2 | 11/2009 | Shimoda |
| 7,624,337 B2 | 11/2009 | Sull et al. |
| 7,627,750 B1 | 12/2009 | Chan |
| 7,627,888 B2 | 12/2009 | Ganesan et al. |

(56)  References Cited

U.S. PATENT DOCUMENTS

| | | | |
|---|---|---|---|
| 7,639,921 B2 | 12/2009 | Seo et al. | |
| 7,640,358 B2 | 12/2009 | Deshpande | |
| 7,640,435 B2 | 12/2009 | Morten | |
| 7,644,172 B2 | 1/2010 | Stewart et al. | |
| 7,653,686 B2 | 1/2010 | Yoneda | |
| 7,664,262 B2 | 2/2010 | Haruki | |
| 7,664,872 B2 | 2/2010 | Osborne et al. | |
| 7,697,686 B2 | 4/2010 | Puiatti et al. | |
| 7,702,925 B2 | 4/2010 | Hanko et al. | |
| 7,711,052 B2 | 5/2010 | Hannuksela et al. | |
| 7,734,806 B2 | 6/2010 | Park | |
| 7,756,270 B2 | 7/2010 | Shimosato et al. | |
| 7,756,271 B2 | 7/2010 | Zhu et al. | |
| 7,787,622 B2 | 8/2010 | Sprunk | |
| 7,797,720 B2 | 9/2010 | Gopalakrishnan et al. | |
| 7,840,693 B2 | 11/2010 | Gupta et al. | |
| 7,853,980 B2 | 12/2010 | Pedlow, Jr. et al. | |
| 7,864,186 B2 | 1/2011 | Robotham et al. | |
| 7,877,002 B2 | 1/2011 | Ikeda et al. | |
| 7,881,478 B2 | 2/2011 | Derouet | |
| 7,885,405 B1 | 2/2011 | Bong | |
| 7,895,311 B1 | 2/2011 | Juenger | |
| 7,907,833 B2 | 3/2011 | Lee | |
| 7,945,143 B2 | 5/2011 | Yahata et al. | |
| 7,949,775 B2 | 5/2011 | Virdi et al. | |
| 7,962,942 B1 | 6/2011 | Craner | |
| 7,970,835 B2 | 6/2011 | St | |
| 7,974,714 B2 | 7/2011 | Hoffberg | |
| 8,001,471 B2 | 8/2011 | Shaver et al. | |
| 8,015,491 B2 | 9/2011 | Shaver et al. | |
| 8,073,900 B2 | 12/2011 | Guedalia et al. | |
| 8,074,083 B1 | 12/2011 | Lee et al. | |
| 8,078,644 B2 | 12/2011 | Hannuksela | |
| 8,131,875 B1 | 3/2012 | Chen | |
| 8,135,041 B2 | 3/2012 | Ramaswamy | |
| 8,160,157 B2 | 4/2012 | Lamy-Bergot et al. | |
| 8,169,916 B1 | 5/2012 | Pai et al. | |
| 8,170,210 B2 | 5/2012 | Manders et al. | |
| 8,213,607 B2 | 7/2012 | Rose et al. | |
| 8,213,768 B2 | 7/2012 | Morioka et al. | |
| 8,218,439 B2 | 7/2012 | Deshpande | |
| 8,243,924 B2 | 8/2012 | Chen et al. | |
| 8,286,213 B2 | 10/2012 | Seo | |
| 8,290,157 B2 | 10/2012 | Candelore | |
| 8,311,094 B2 | 11/2012 | Kamariotis et al. | |
| 8,312,079 B2 | 11/2012 | Newsome et al. | |
| 8,365,235 B2 | 1/2013 | Hunt et al. | |
| 8,369,421 B2 | 2/2013 | Kadono et al. | |
| 8,380,041 B2 | 2/2013 | Barton et al. | |
| 8,397,265 B2 | 3/2013 | Henocq et al. | |
| 8,401,188 B1 | 3/2013 | Swaminathan | |
| 8,472,792 B2 | 6/2013 | Butt et al. | |
| 8,514,926 B2 | 8/2013 | Ro et al. | |
| 8,526,610 B2 | 9/2013 | Shamoon et al. | |
| 8,543,842 B2 | 9/2013 | Ginter et al. | |
| 8,555,329 B2 | 10/2013 | Fröjdh et al. | |
| 8,571,993 B2 | 10/2013 | Kocher et al. | |
| 8,630,419 B2 | 1/2014 | Mori | |
| 8,631,247 B2 | 1/2014 | O'loughlin et al. | |
| 8,649,669 B2 | 2/2014 | Braness et al. | |
| 8,650,599 B2 | 2/2014 | Shindo et al. | |
| 8,683,066 B2 | 3/2014 | Hurst et al. | |
| 8,731,193 B2 | 5/2014 | Farkash et al. | |
| 8,731,369 B2 | 5/2014 | Li et al. | |
| 8,782,268 B2 | 7/2014 | Pyle et al. | |
| 8,804,956 B2 | 8/2014 | Hiriart | |
| 8,818,896 B2 | 8/2014 | Candelore | |
| 8,819,116 B1 | 8/2014 | Tomay et al. | |
| 8,849,950 B2 | 9/2014 | Stockhammer et al. | |
| 8,850,205 B2 | 9/2014 | Choi et al. | |
| 8,850,498 B1 | 9/2014 | Roach et al. | |
| 8,918,533 B2 | 12/2014 | Chen et al. | |
| 9,015,782 B2 | 4/2015 | Acharya et al. | |
| 9,020,039 B2 | 4/2015 | van der Schaar | |
| 9,021,119 B2 | 4/2015 | Van Der Schaar et al. | |
| 9,038,116 B1 | 5/2015 | Knox et al. | |
| 9,038,121 B2 | 5/2015 | Kienzle et al. | |
| 9,111,098 B2 | 8/2015 | Smith et al. | |
| 9,191,151 B2 | 11/2015 | Luby et al. | |
| 9,324,375 B1* | 4/2016 | Casalena | G11B 27/038 |
| 9,380,096 B2 | 6/2016 | Luby et al. | |
| 9,386,064 B2 | 7/2016 | Luby et al. | |
| 9,485,469 B2 | 11/2016 | Kahn et al. | |
| 9,615,061 B2 | 4/2017 | Carney et al. | |
| 9,628,536 B2 | 4/2017 | Luby et al. | |
| 9,667,967 B2 | 5/2017 | Van Der Schaar | |
| 9,674,254 B2 | 6/2017 | Pare et al. | |
| 9,761,274 B2 | 9/2017 | Delpuch et al. | |
| 9,967,521 B2 | 5/2018 | Kahn et al. | |
| 10,171,873 B2 | 1/2019 | Krebs | |
| 10,326,987 B2 | 6/2019 | van der schaar | |
| 10,764,579 B2 | 9/2020 | van der Schaar | |
| 2001/0021276 A1 | 9/2001 | Zhou | |
| 2001/0052077 A1 | 12/2001 | Fung et al. | |
| 2001/0052127 A1 | 12/2001 | Seo et al. | |
| 2001/0053222 A1 | 12/2001 | Wakao et al. | |
| 2002/0048450 A1 | 4/2002 | Zetts | |
| 2002/0067432 A1 | 6/2002 | Kondo et al. | |
| 2002/0075572 A1 | 6/2002 | Boreczky et al. | |
| 2002/0107802 A1 | 8/2002 | Philips | |
| 2002/0114330 A1 | 8/2002 | Cheung et al. | |
| 2002/0135607 A1 | 9/2002 | Kato et al. | |
| 2002/0141503 A1 | 10/2002 | Kobayashi et al. | |
| 2002/0154779 A1 | 10/2002 | Asano et al. | |
| 2002/0161797 A1 | 10/2002 | Gallo et al. | |
| 2002/0164024 A1 | 11/2002 | Arakawa et al. | |
| 2002/0169926 A1 | 11/2002 | Pinckney et al. | |
| 2002/0169971 A1 | 11/2002 | Asano et al. | |
| 2003/0002577 A1 | 1/2003 | Pinder | |
| 2003/0043847 A1 | 3/2003 | Haddad | |
| 2003/0044080 A1 | 3/2003 | Frishman et al. | |
| 2003/0051237 A1 | 3/2003 | Sako et al. | |
| 2003/0053541 A1 | 3/2003 | Sun et al. | |
| 2003/0061369 A1 | 3/2003 | Aksu et al. | |
| 2003/0063675 A1 | 4/2003 | Kang et al. | |
| 2003/0077071 A1 | 4/2003 | Lin et al. | |
| 2003/0079222 A1 | 4/2003 | Boykin et al. | |
| 2003/0081776 A1 | 5/2003 | Candelore | |
| 2003/0135633 A1 | 7/2003 | Dror et al. | |
| 2003/0135742 A1 | 7/2003 | Evans | |
| 2003/0142594 A1 | 7/2003 | Tsumagari et al. | |
| 2003/0152224 A1 | 8/2003 | Candelore et al. | |
| 2003/0206717 A1 | 11/2003 | Yogeshwar et al. | |
| 2003/0236907 A1 | 12/2003 | Stewart et al. | |
| 2004/0001594 A1 | 1/2004 | Krishnaswamy et al. | |
| 2004/0003008 A1 | 1/2004 | Wasilewski et al. | |
| 2004/0022391 A1 | 2/2004 | Obrien | |
| 2004/0028227 A1 | 2/2004 | Yu | |
| 2004/0037421 A1 | 2/2004 | Truman | |
| 2004/0047592 A1 | 3/2004 | Seo et al. | |
| 2004/0047607 A1 | 3/2004 | Seo et al. | |
| 2004/0049690 A1 | 3/2004 | Candelore et al. | |
| 2004/0049694 A1 | 3/2004 | Candelore | |
| 2004/0073917 A1 | 4/2004 | Pedlow et al. | |
| 2004/0076237 A1 | 4/2004 | Kadono et al. | |
| 2004/0081333 A1 | 4/2004 | Grab et al. | |
| 2004/0088557 A1 | 5/2004 | Malcolm et al. | |
| 2004/0093494 A1 | 5/2004 | Nishimoto et al. | |
| 2004/0101059 A1 | 5/2004 | Joch et al. | |
| 2004/0101142 A1 | 5/2004 | Nasypny | |
| 2004/0107356 A1 | 6/2004 | Shamoon et al. | |
| 2004/0213094 A1 | 10/2004 | Suzuki | |
| 2004/0243714 A1 | 12/2004 | Wynn et al. | |
| 2004/0267952 A1 | 12/2004 | He et al. | |
| 2005/0005143 A1 | 1/2005 | Lang et al. | |
| 2005/0013494 A1 | 1/2005 | Srinivasan et al. | |
| 2005/0063541 A1 | 3/2005 | Candelore | |
| 2005/0066063 A1 | 3/2005 | Grigorovitch et al. | |
| 2005/0076232 A1 | 4/2005 | Kawaguchi | |
| 2005/0102371 A1 | 5/2005 | Aksu | |
| 2005/0120132 A1 | 6/2005 | Hutter | |
| 2005/0138655 A1 | 6/2005 | Zimler et al. | |
| 2005/0144468 A1 | 6/2005 | Northcutt | |
| 2005/0177741 A1 | 8/2005 | Chen et al. | |

(56) References Cited

U.S. PATENT DOCUMENTS

| | | |
|---|---|---|
| 2005/0190911 A1 | 9/2005 | Pare et al. |
| 2005/0192904 A1 | 9/2005 | Candelore |
| 2005/0198364 A1 | 9/2005 | Val et al. |
| 2005/0207442 A1 | 9/2005 | Zoest et al. |
| 2005/0207578 A1 | 9/2005 | Matsuyama et al. |
| 2005/0216752 A1 | 9/2005 | Hofmeyr et al. |
| 2005/0227773 A1 | 10/2005 | Lu et al. |
| 2005/0243912 A1 | 11/2005 | Kwon et al. |
| 2005/0262257 A1 | 11/2005 | Major et al. |
| 2005/0265555 A1 | 12/2005 | Pippuri |
| 2006/0013568 A1 | 1/2006 | Rodriguez |
| 2006/0026654 A1 | 2/2006 | An et al. |
| 2006/0037057 A1 | 2/2006 | Xu |
| 2006/0093318 A1 | 5/2006 | Cohen et al. |
| 2006/0095472 A1 | 5/2006 | Krikorian et al. |
| 2006/0109856 A1 | 5/2006 | Deshpande |
| 2006/0129909 A1 | 6/2006 | Butt et al. |
| 2006/0165163 A1 | 7/2006 | Burazerovic et al. |
| 2006/0165166 A1* | 7/2006 | Chou .............. H04N 21/2402 |
| | | 375/E7.017 |
| 2006/0168298 A1 | 7/2006 | Aoki et al. |
| 2006/0210245 A1 | 9/2006 | Mccrossan et al. |
| 2006/0212370 A1 | 9/2006 | Shear et al. |
| 2006/0218251 A1 | 9/2006 | Tanabe |
| 2006/0235883 A1 | 10/2006 | Krebs |
| 2007/0044010 A1 | 2/2007 | Sull et al. |
| 2007/0047645 A1 | 3/2007 | Takashima |
| 2007/0055982 A1 | 3/2007 | Spilo |
| 2007/0067472 A1 | 3/2007 | Maertens et al. |
| 2007/0083467 A1 | 4/2007 | Lindahl et al. |
| 2007/0106863 A1 | 5/2007 | Bonwick et al. |
| 2007/0157267 A1 | 7/2007 | Lopez-Estrada |
| 2007/0160127 A1 | 7/2007 | Ratakonda et al. |
| 2007/0162568 A1 | 7/2007 | Gupta et al. |
| 2007/0162981 A1 | 7/2007 | Morioka et al. |
| 2007/0166000 A1 | 7/2007 | Nallur et al. |
| 2007/0180051 A1 | 8/2007 | Kelly et al. |
| 2007/0201502 A1 | 8/2007 | Abramson |
| 2007/0204003 A1 | 8/2007 | Abramson |
| 2007/0204011 A1 | 8/2007 | Shaver et al. |
| 2007/0204115 A1 | 8/2007 | Abramson |
| 2007/0220118 A1 | 9/2007 | Loyer |
| 2007/0250536 A1 | 10/2007 | Tanaka et al. |
| 2008/0008455 A1 | 1/2008 | De Lange et al. |
| 2008/0022005 A1 | 1/2008 | Wu et al. |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2008/0155615 A1 | 6/2008 | Craner et al. |
| 2008/0160911 A1 | 7/2008 | Chou et al. |
| 2008/0168516 A1 | 7/2008 | Flick et al. |
| 2008/0177793 A1 | 7/2008 | Epstein et al. |
| 2008/0225953 A1 | 9/2008 | Ratakonda et al. |
| 2008/0271102 A1 | 10/2008 | Kienzle et al. |
| 2008/0320100 A1 | 12/2008 | Pantos et al. |
| 2009/0010429 A1 | 1/2009 | Kim et al. |
| 2009/0010622 A1 | 1/2009 | Yahata et al. |
| 2009/0013195 A1 | 1/2009 | Ochi et al. |
| 2009/0067367 A1 | 3/2009 | Buracchini et al. |
| 2009/0077143 A1 | 3/2009 | Macy, Jr. |
| 2009/0106082 A1 | 4/2009 | Senti et al. |
| 2009/0116551 A1* | 5/2009 | Nilsson .................. H04L 65/70 |
| | | 375/240.03 |
| 2009/0132599 A1 | 5/2009 | Soroushian et al. |
| 2009/0169001 A1 | 7/2009 | Tighe et al. |
| 2009/0178090 A1 | 7/2009 | Oztaskent |
| 2009/0249081 A1 | 10/2009 | Zayas |
| 2009/0282162 A1 | 11/2009 | Mehrotra et al. |
| 2009/0300203 A1 | 12/2009 | Virdi et al. |
| 2009/0310819 A1 | 12/2009 | Hatano |
| 2010/0129056 A1 | 5/2010 | Connery et al. |
| 2010/0142915 A1 | 6/2010 | Mcdermott et al. |
| 2010/0158101 A1* | 6/2010 | Wu .................... H04N 21/2662 |
| | | 375/E7.003 |
| 2010/0185854 A1 | 7/2010 | Burns et al. |

| | | |
|---|---|---|
| 2010/0198943 A1 | 8/2010 | Harrang et al. |
| 2010/0246662 A1 | 9/2010 | Koto et al. |
| 2011/0010466 A1 | 1/2011 | Fan et al. |
| 2011/0035517 A1 | 2/2011 | Minnick et al. |
| 2011/0058675 A1 | 3/2011 | Brueck et al. |
| 2011/0083009 A1 | 4/2011 | Shamoon et al. |
| 2011/0096828 A1 | 4/2011 | Chen et al. |
| 2011/0103374 A1 | 5/2011 | Lajoie et al. |
| 2011/0135090 A1 | 6/2011 | Chan et al. |
| 2011/0145858 A1 | 6/2011 | Philpott et al. |
| 2011/0158470 A1 | 6/2011 | Martin et al. |
| 2011/0158612 A1 | 6/2011 | Takeda |
| 2011/0170687 A1 | 7/2011 | Hyodo et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0238789 A1 | 9/2011 | Luby et al. |
| 2011/0246661 A1 | 10/2011 | Manzari et al. |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0110120 A1 | 5/2012 | Willig et al. |
| 2012/0134496 A1 | 5/2012 | Farkash et al. |
| 2012/0167132 A1 | 6/2012 | Mathews et al. |
| 2012/0177101 A1 | 7/2012 | Van Der Schaar |
| 2012/0179834 A1 | 7/2012 | Van Der Schaar et al. |
| 2012/0311174 A1 | 12/2012 | Bichot et al. |
| 2012/0331167 A1 | 12/2012 | Hunt |
| 2013/0013803 A1 | 1/2013 | Bichot et al. |
| 2013/0080267 A1 | 3/2013 | McGowan |
| 2014/0140253 A1 | 5/2014 | Lohmar et al. |
| 2014/0149557 A1 | 5/2014 | Lohmar et al. |
| 2015/0019550 A1 | 1/2015 | Maharajh et al. |
| 2015/0288530 A1 | 10/2015 | Oyman |
| 2015/0296205 A1 | 10/2015 | van der Schaar |
| 2016/0323342 A1 | 11/2016 | Luby et al. |
| 2017/0011055 A1 | 1/2017 | Pitts |
| 2017/0230655 A1 | 8/2017 | van der Schaar et al. |
| 2018/0046949 A1 | 2/2018 | Kahn et al. |
| 2018/0255366 A1 | 9/2018 | Lockett et al. |
| 2019/0306501 A1 | 10/2019 | van der Schaar |
| 2020/0351496 A1 | 11/2020 | van der Schaar |

FOREIGN PATENT DOCUMENTS

| | | | |
|---|---|---|---|
| EP | 1453319 A1 | 9/2004 | |
| EP | 1536646 A1 | 6/2005 | |
| EP | 1641271 A2 | 3/2006 | |
| EP | 1283640 B1 | 10/2006 | |
| EP | 2180664 A1 | 4/2010 | |
| EP | 2360923 A1 | 8/2011 | |
| GB | 2398210 A | 8/2004 | |
| JP | 10190746 A | 7/1998 | |
| JP | H1175178 A | 3/1999 | |
| JP | 2004172830 A | 6/2004 | |
| JP | 2004289628 A | 10/2004 | |
| JP | 2005173241 A | 6/2005 | |
| JP | 2005284041 A | 10/2005 | |
| JP | 2009004897 A | 1/2009 | |
| JP | 4516082 B2 | 5/2010 | |
| JP | 2010232720 A | 10/2010 | |
| KR | 20040039852 A | 5/2004 | |
| KR | 20060030164 A | 4/2006 | |
| KR | 20060106250 A | 10/2006 | |
| KR | 20060116967 A | 11/2006 | |
| KR | 20070020727 A | 2/2007 | |
| KR | 20090016282 A | 2/2009 | |
| MX | 376832 | 11/2020 | |
| RU | 2328040 C2 | 6/2008 | |
| WO | 199800973 A1 | 1/1998 | |
| WO | 199834405 A1 | 8/1998 | |
| WO | 1998047290 | 10/1998 | |
| WO | 2000035201 A1 | 6/2000 | |
| WO | 2000049762 A2 | 8/2000 | |
| WO | 2000049763 A1 | 8/2000 | |
| WO | 200223315 A2 | 3/2002 | |
| WO | 2003028293 | 4/2002 | |

(56)                    References Cited

FOREIGN PATENT DOCUMENTS

| WO | 2002035832 | A2 | 5/2002 |
|---|---|---|---|
| WO | 2002054776 | | 7/2002 |
| WO | 2002073437 | A1 | 9/2002 |
| WO | 2002087241 | A1 | 10/2002 |
| WO | 2003046750 | A1 | 6/2003 |
| WO | 2003047262 | A2 | 6/2003 |
| WO | 2003061173 | A2 | 7/2003 |
| WO | 2004012378 | A2 | 2/2004 |
| WO | 2004100158 | A1 | 11/2004 |
| WO | 2005008385 | A2 | 1/2005 |
| WO | 2005015935 | A1 | 2/2005 |
| WO | 2005057906 | A2 | 6/2005 |
| WO | 2005125214 | A2 | 12/2005 |
| WO | 2007072257 | A1 | 6/2007 |
| WO | 2007093923 | A1 | 8/2007 |
| WO | 2007101182 | A2 | 9/2007 |
| WO | 2008032908 | A1 | 3/2008 |
| WO | 2009006302 | A1 | 1/2009 |
| WO | 2009109976 | A2 | 9/2009 |
| WO | 2011087449 | A1 | 7/2011 |
| WO | 2011101371 | A1 | 8/2011 |
| WO | 2011103364 | A1 | 8/2011 |
| WO | 2012094258 | A1 | 7/2012 |

OTHER PUBLICATIONS

International Preliminary Report on Patentability for International Application No. PCT/US2011/068284, Report issued Jul. 10, 2013, Mailed Jul. 10, 2013, 6 Pgs.
International Search Report and Written Opinion for International Application No. PCT/US2011/068284, Report Completed Mar. 30, 2012, 8 pgs.
International Standard, Information technology—Generic coding of moving pictures and associated audio information: Systems, ISO/IEC 13818-1:2000(E), Dec. 1, 2000 174 pgs. (presented in 2 parts).
Information Technology—MPEG Systems Technologies—Part 7: Common Encryption in ISO Base Media File Format Files (ISO/IEC 23001-7), Apr. 2015, 24 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision Jan. 20, 2003, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
Revised 3rd Edition H. 264/AVC Textbook, Impress R&D K. K., 1st Ed, Reference showing a well-known technique, Jan. 1, 2009, pp. 185-193.
"Advanced video coding for generic audiovisual services", International Telecommunication Union ITU-T Recommendation H.264, Telecommunication Standardization Sector of ITU, Series H: Audio-visual and Multimedia Systems, May 7, 2004, pp. 13-26.

"Apple HTTP Live Streaming specification", Aug. 2017, 60 pgs.
"Broadcom BCM7413 Product Brief", Dec. 11, 2008, 2 pgs.
"Common Interface Specification for Conditional Access and other Digital Video Broadcasting Decoder Applications", European Standard, EN 50221, Feb. 1997, 86 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information technology—Generic coding of moving pictures and associated audio information: Systems; H.222.0", ITU-T Standard, International Telecommunication Union, Geneva; CH, No. 20120704, May 2006, retrieved on Jul. 23, 2007, May 29, 2006, pp. 1-190.
"Information Technology—Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Server 'Trick Play' support for MPEG-2 Transport Stream Files", www.live555.com/liveMedia/transport-stream-trick-play.html, 2006, Dec. 31, 2020, 1 pg.
"Single-Encode Streaming for Multiple Screen Delivery", Telestream Wowza Media Systems, 2009, 6 pgs.
"The LIVE555 Media Server", www.live555.com/mediaServer/#about, 2006, printed Dec. 31, 2020, 3 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
ADB, "ADB-3800W Datasheet", 2007, 2 pgs.
Agi et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Anonymous, "Series H: Audiovisual and Multimedia Systems", Infrastructure of audiovisual services—Coding of moving video, International Telecommunication Union, Mar. 2005, 49 Pages.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Arachchi et al., "Adaptation-aware encryption of scalable H.264/AVC for content security", Signal Processing: Image Communication, Jul. 2009, vol. 24, pp. 468-483, doi: 10.1016/j.image.2009.02.004.
Asai et al., "Essential Factors for Full-Interactive VOD Server: Video File System, Disk Scheduling, Network", Proceedings of Globecom '95, Nov. 14-16, 1995, 6 pgs.

(56)                References Cited

OTHER PUBLICATIONS

Beker et al., "Cipher Systems, The Protection of Communications", 1982, 40 pgs.
Bocharov et al., "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, an Approach for Next Generation Mobile Technologies", Thesis, 2010, 84 pgs.
Conklin et al., "Video coding for streaming media delivery on the Internet", IEEE Transactions on Circuits and Systems for Video Technology, Mar. 2001, vol. 11, No. 3, pp. 269-281.
Deshpande et al., "Scalable Streaming of JPEG2000 Images Using Hypertext Transfer Protocol", Multimedia '01: Proceedings of the Ninth ACM International Conference on Multimedia, Oct. 2001, pp. 372-381. https://doi.org/10.1145/500141.500197.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Duplicate, "Information technology—Generic coding of moving pictures and associated audio information: Systems", International Telecommunication Union ITU-T Recommendation H.222.0, Telecommunication Standardization Sector of ITU, Series H: Audiovisual and Multimedia Systems, May 2006, 84 pages.
Dworkin, "Recommendation for Block Cipher Modes of Operation: Methods and Techniques", NIST Special Publication 800-38A, 2001, 66 pgs.
Entone, "Amulet High Definition IP Television Receiver User's Guide", 2008, 28 pgs.
Entone, "Hydra HD IP Video Gateway", 2008, 2 pgs.
ETSI, "Digital Video Broadcasting (DVB) Support for use of scrambling and Conditional Access (CA) within digital broadcasting systems", Oct. 1996, 13 pgs.
ETSI, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.
Fahmi et al., "Proxy Servers for Scalable Interactive Video Support", Computer, Sep. 2001, vol. 45, No. 9, pp. 54-60, https://doi.org/10.1109/2.947092.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.

Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI:10.1109/49.957315.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Ho, "Digital Video Broadcasting Conditional Access Architecture", Report prepared for CS265—Section 2, Fall 2002, Prof Stamp, 7 pgs.
Huang, U.S. Pat. No. 7,729,426, U.S. Appl. No. 11/230,794.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
INCITS/ISO/IEC, "Information Technology—Generic Coding of Moving Pictures and Associated Audio Information: Video (Formerly ANSI/ISO/IEC 13818-2-2000)", Second edition, Dec. 15, 2000, 220 pgs., (presented in two parts).
ISMA, "ISMA Encryption and Authentication, Version 1.1, Area / Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to ITU-T J.89, ITU-T Recommendation J.96, Mar. 2001, 34 pgs.
Jain et al., U.S. Appl. No. 61/522,623.
Jung et al., "Design and Implementation of an Enhanced Personal Video Recorder for DTV", IEEE Transactions on Consumer Electronics, vol. 47, No. 4, Nov. 2001, 6 pgs.
Kabir, "Scalable and Interactive Multimedia Streaming Over the Internet", Thesis, 2005, 207 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al, "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Krikor et al., "Image Encryption Using DCT and Stream Cipher", European Journal of Scientific Research, Jan. 2009, vol. 32, No. 1, pp. 48-58.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.
Lievaart, "Characteristics that differentiate CA Systems", Irdeto access, Nov. 2001, 5 pgs.
List et al., "Adaptive deblocking filter", IEEE transactions on circuits and systems for video technology, vol. 13, No. 7, Jul. 2003, pp. 614-619.
Lloyd, "Supporting Trick Mode Playback Universally Across the Digital Television Industry", Thesis, 2005, 111 pgs.
Macaulay et al., "Whitepaper—IP Streaming of MPEG-4: Native RTP vs MPEG-2 Transport Stream", Envivio, Oct. 2005, 12 pgs.

(56) References Cited

OTHER PUBLICATIONS

Martin et al., "Privacy Protected Surveillance Using Secure Visual Object Coding", IEEE Transactions on Circuits and Systems for Video Technology, Aug. 2008, vol. 18, No. 8, pp. 1152-1162, DOI: 10.1109/TCSVT.2008.927110.

Massoudi et al., "Overview on Selective Encryption of Image and Video: Challenges and Perspectives", EURASIP Journal on Information Security, Nov. 2008, 18 pgs.

Mccanne et al., "Receiver-driven Layered Multicast", Conference proceedings on Applications, technologies, architectures, and protocols for computer communications, Aug. 1996, 14 pgs.

Meier, "Reduction of Blocking Artifacts in Image and Video Coding", IEEE Transactions on Circuits and Systems for Video Technology, vol. 9, No. 3, Apr. 1999, pp. 490-500.

Meyer et al., "Security mechanisms for Multimedia-Data with the Example MPEG-I-Video", SECMPEG, 1992, 10 pgs.

Molavi et al., "A Security Study of Digital TV Distribution Systems", Thesis, Jun. 2005, 112 pgs.

Nelson, "Smooth Streaming Deployment Guide", Microsoft Expression Encoder, Aug. 2010, 66 pgs.

Nelson, "The Data Compression Book", M&T Publishing, 1992, 533 pgs., (presented in two parts).

Newton et al., "Preserving Privacy by De-identifying Facial Images", Carnegie Mellon University School of Computer Science, Technical Report, CMU-CS-03-119, Mar. 2003, 26 pgs.

O'Brien, U.S. Appl. No. 60/399,846.

OIPF Open Forum, "OIPF Release 1 Specification, vol. 3, Content Metadata", OIPF, Oct. 8, 2009, vol. 1.1, 47 pgs.

OIPF Open Forum, "OIPF Release 1 Specification, vol. 7—Authentication, Content Protection and Service Protection", OIPF, Oct. 8, 2009, vol. 1.1, 88 pgs.

Open IPTV Forum, "Functional Architecture", Jan. 16, 2008, vol. 1.1, 141 pgs.

Open IPTV Forum, "OIPF Release 1 Specification, vol. 1—Overview", OIPF, Oct. 8, 2009, vol. 1.1, 48 pgs.

Open IPTV Forum, "OIPF Release 1 Specification, vol. 2, Media Formats" OIPF, Oct. 8, 2009, vol. 1.1, 22 pgs.

O'Rourke, "Improved Image Decompression for Reduced Transform Coding Artifacts", IEEE Transactions on Circuits and Systems for Video Technology, vol. 5, No. 6, Dec. 1995, pp. 490-499.

Park et al., "A postprocessing method for reducing quantization effects in low bit-rate moving picture coding", IEEE Transactions on Circuits and Systems for Video Technology, vol. 9, No. 1, Feb. 1999, pp. 161-171.

Park et al., "An Efficient Encryption and Key Management Scheme for Layered Access Control of H.265/Scalable Video Coding", IEICI Trans. Inf. & Syst., May 2009, vol. E92-D, No. 5, pp. 851-858, DOI: 1031587/transinf.E92.D.851.

Park et al., "Combined Scheme of Encryption and Watermarking in H.264/Scalable Video Coding", New Directions in Intelligent Interactive Multimedia, SCI 142, 2008, pp. 351-361.

Qiao et al., "Comparison of MPEG Encryption Algorithms", Comput. & Graphics, 1998, vol. 22, No. 4, pp. 437-448.

Raju et al., "Fast and Secure Real-Time Video Encryption", Sixth Indian Conference on Computer Vision, Graphics & Image Processing, Jan. 2009, pp. 257-264, doi:10.1109/ACVGIP.2008.100.

Richardson, "H.264 and MPEG-4 Video Compression", Wiley, 2003, 306 pgs. (presented in 2 parts).

Senoh et al., "DRM Renewability & Interoperability", IEEE Xplore, Conference: Consumer Communications and Networking Conference, 2004, Feb. 2004, pp. 424-429, DOI: 10.1109/CCNC.2004. 1286899, Conference: Consumer Communications and Networking Conference, 2004. CCNC 2004. First IEEE.

Shojania et al., "Experiences with MPEG-4 Multimedia Streaming", CiteSeer, Jan. 2001, 3 pgs., DOI: 10.1145/500141.500221.

Sima et al., "An Efficient Architecture for Adaptive Deblocking Filter of H.264 AVC Video Coding", IEEE Transactions on Consumer Electronics, vol. 50, No. 1, Feb. 2004, pp. 292-296.

Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.

Srinivasan et al., "Windows Media Video 9: overview and applications", Signal Processing: Image Communication, 2004, 25 pgs.

Stockhammer, "Dynamic Adaptive Streaming over HTTP—Standards and Design Principles", Proceedings of the second annual ACM conference on Multimedia, Feb. 2011, pp. 133-145.

Symes, "Video Compression Demystified", McGraw-Hill, 2001, 353 pgs., (presented in two parts).

Taymans et al., "GStreamer Application Development Manual (1.6.0)", 2007, 159 pgs.

Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP. 2007.4379960.

Timmerer et al., "HTTP Streaming of MPEG Media", Proceedings of Streaming Day, 2010, 4 pgs.

Tiphaigne et al., "A Video Package for Torch", Jun. 2004, 46 pgs.

Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No. 00TH8532), Jul. 30-Aug. 2, 2000, pp. 119-122, DOI: 10.1109/ICME.2000.869559.

Trappe et al., "Key Management and Distribution for Secure Multimedia Multicast", IEEE Transaction on Multimedia, vol. 5, No. 4, Dec. 2003, pp. 544-557.

Um, "Selective Video Encryption of Distributed Video Coded Bitstreams and Multicast Security over Wireless Networks", Thesis, Aug. 2006, 142 pgs.

Van Deursen et al., "On Media Delivery Protocols in the Web", 2010 IEEE International Conference on Multimedia and Expo, Jul. 19-23, 2010, 6 pgs.

Ventura, Guillermo Albaida "Streaming of Multimedia Learning Objects", AG Integrated Communication System, Mar. 2003, 101 pgs.

Waggoner, "Compression for Great Digital Video", 2002, 184 pgs.

Walker, M D. et al., "Mobile Video Streaming", BT Technology Journal, Springer, Dordrecht, NL, vol. 21, No. 3, Jul. 1, 2003, pp. 192-202.

Wang, "Lightweight Encryption in Multimedia", Thesis, Jun. 2005, 184 pgs.

Watanabem et al., "MPEG-2 decoder enables DTV trick plays", esearcher System LSI Development Lab, Fujitsu Laboratories Ltd., Kawasaki, Japan, Jun. 2001, 2 pgs.

Wiegand, "Joint Video Team (JVT) of ISO/IEC MPEG and ITU-T VCEG", Jan. 2002, 70 pgs.

Willig et al., U.S. Appl. No. 61/409,285.

Wong, "Web Client Programming with Perl", 1997, printed Jan. 8, 2021 from: https://www.oreilly.com/openbook-webclientch03.html, 31 pgs.

Wu, "A Fast MPEG Encryption Algorithm and Implementation of AES on CAM", Thesis, Oct. 6, 2003, 91 pgs.

Yang et al., "Projection-Based Spatially Adaptive Reconstruction of Block-Transform Compressed Images", IEEE Transactions on Image Processing, vol. 4, No. 7, Jul. 1995, pp. 896-908.

Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.

Yu et al., "Video deblocking with fine-grained scalable complexity for embedded mobile computing", Proceedings 7th International Conference on Signal Processing, Aug. 31-Sep. 4, 2004, pp. 1173-1178.

Yuksel, "Partial Encryption of Video for Communication and Storage", Thesis, Sep. 2003, 78 pgs.

Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

"Delivering Live and On-Demand Smooth Streaming", Microsoft Silverlight, 2009, 28 pgs.

"Information technology—Generic coding of moving pictures and associated audio information: Systems", International Telecommunication Union ITU-T Recommendation H.222.0, Telecommunica-

(56) References Cited

OTHER PUBLICATIONS tion Standardization Sector of ITU, Series H: Audiovisual and Multimedia Systems, May 2006, pp. 155-176.

"Information technology—Generic coding of moving pictures and associated audio information: Systems", International Telecommunication Union ITU-T Recommendation H.222.0, Telecommunication Standardization Sector of ITU, Series H: Audiovisual and Multimedia Systems, May 2006, pp. 71-154.

* cited by examiner

SYSTEMS AND METHODS FOR ENCODING ALTERNATIVE STREAMS OF VIDEO FOR USE IN ADAPTIVE BITRATE STREAMING

CROSS REFERENCE TO RELATED APPLICATIONS

This application is a continuation of U.S. application Ser. No. 16/931,287, entitled "Systems and Methods for Encoding Alternative Streams of Video for Use in Adaptive Bitrate Streaming," to Auke Sjoerd van der Schaar, filed Jul. 16, 2020, which application is a continuation of U.S. application Ser. No. 16/443,254, entitled "Systems and Methods for Encoding Alternative Streams of Video for Use in Adaptive Bitrate Streaming," to Auke Sjoerd van der Schaar, filed Jun. 17, 2019 and issued on Sep. 1, 2020 as U.S. Pat. No. 10,764,579, which application is a continuation of U.S. application Ser. No. 15/453,714, entitled "Systems and Methods for Encoding Alternative Streams of Video for Use in Adaptive Bitrate Streaming," to Auke Sjoerd van der Schaar, filed Mar. 8, 2017 and issued on Jun. 18, 2019 as U.S. Pat. No. 10,326,987, which application is continuation of U.S. application Ser. No. 14/696,035, entitled "Systems and Methods for Encoding Alternative Streams of Video for Use in Adaptive Bitrate Streaming," to Auke Sjoerd van der Schaar, filed Apr. 24, 2015 and issued on May 30, 2017 as U.S. Pat. No. 9,667,967, which application is a continuation of U.S. application Ser. No. 13/341,504 entitled "Systems and Methods for Encoding Alternative Streams of Video for Use in Adaptive Bitrate Streaming," to Auke Sjoerd van der Schaar, filed Dec. 30, 2011 and issued on Apr. 28, 2015 as U.S. Pat. No. 9,020,039, which claims priority to U.S. Provisional Application Ser. No. 61/430,502, entitled "Systems and Methods for Performing Adaptive Bitrate Streaming Based Upon the Seek Delay of Each Stream and the Channel Rate," to Auke Sjoerd van der Schaar, filed Jan. 6, 2011, the disclosures of which are incorporated by reference herein in their entireties.

FIELD OF THE INVENTION

The present invention generally relates to adaptive bitrate streaming and more specifically to the buffering of media by playback devices in adaptive bitrate streaming systems.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth) in real time and adjusting the quality of the streamed media accordingly. Typically, the source media is encoded at multiple bit rates and the playback device or client switches between streaming the different encodings depending on available resources.

A common goal with adaptive bitrate streaming is to stream the highest bitrate stream available given the streaming conditions experienced by the playback device without stalls in the playback of media due to underflow. Underflow occurs when the playback device receives streaming media at a lower speed than the speed at which the media is played back. The video used in most adaptive bitrate streaming systems is encoded using variable bit rate encoding, which is typically more efficient. Even though the bitrate of the stream varies in time, the stream is typically described based upon its average bit rate. When variable bitrate encoding is used, the maximum bitrate of the stream is the rate that ensures no underflow will occur given a certain buffer size. Most playback devices accommodate variation in the size of the encoded frames using a buffer. In the context of video, the buffering delay (which can also be referred to as the seek delay) is the time a playback device must wait between starting filling the buffer and commencing playback to prevent underflow (i.e. a certain amount of data is buffered before decoding can start).

SUMMARY OF THE INVENTION

Systems and methods in accordance with embodiments of the invention encode alternative streams for use in adaptive bitrate streaming based upon the delay of each stream. One embodiment of the invention includes memory, and a processor configured by a source encoding application to: receive multimedia content, where the multimedia content includes source video data having a primary resolution and a primary sample aspect ratio; and encode the source video data as a set of alternative video streams, where: the alternative video streams have different maximum bitrates; and the alternative video streams are encoded to have an upper bound seek delay that is equal to or less than the upper bound seek delay of streams in the set of alternative video streams that are encoded at a higher maximum bitrate.

In a further embodiment, the source encoding application further configures the processor to encode the alternative video streams at predetermined maximum bitrates and maximum buffer sizes, and the upper bound seek delay of a stream is determined by dividing the predetermined maximum buffer size of the stream by the predetermined maximum bitrate of the stream.

In another embodiment, the source encoding application further configures the processor to encode the alternative video streams so that each stream in the set of alternative streams has the same aspect ratio.

In a still further embodiment, the source encoding application further configures the processor to determine a lower bound seek delay for each stream in the set of alternative video streams.

In still another embodiment, the source encoding application further configures the processor to include within each stream its lower bound seek delay.

In a yet further embodiment, the source encoding application further configures the processor to determine the alternative stream that has the highest lower bound seek delay, and include the highest lower bound seek delay within each stream.

In yet another embodiment, the alternative video streams are encoded in accordance with the H.264 standard.

In a further embodiment again, the source encoding application further configures the processor to include the highest lower bound seek delay in a initial_cpb_removal_delay field in an SEI buffering message within each stream.

In another embodiment again, the source encoding application configures the processor to determine the lower bound seek delay as follows:

US 12,610,044 B2

3

$$\text{Delay} = \max \forall \text{ chunks} \left( \frac{\sum_{i=0}^{n} \text{size chunk}_i}{\text{rate}} - (n-1) \cdot \text{duration chunk} \right)$$

In a further additional embodiment, the source encoding application configures the processor to determine the upper bound seek delay as follows:

$$\text{Delay} = \frac{\text{level buffersize} + \text{level rate} \cdot \text{duration chunk}}{\text{rate}}$$

where level buffersize is the maximum buffer size constraint used in encoding the video stream;
duration chunk is the time taken to playback a single chunk of video;
level rate is the maximum bitrate of the video; and
rate is the network data rate.

Another additional embodiment also includes receiving multimedia content, where the multimedia content includes source video data having a primary resolution and a primary sample aspect ratio using a source encoder, encoding the source video data as a set of alternative video streams using the source encoder, where: the alternative video streams have different maximum bitrates, and the alternative video streams are encoded to have an upper bound seek delay that is equal to or less than the upper bound seek delay of streams in the set of alternative video streams that are encoded at a higher maximum bitrate.

A still yet further embodiment also includes encoding the alternative video streams at predetermined maximum bitrates and maximum buffer sizes using the source encoder. In addition, the upper bound seek delay of a stream is determined by dividing the predetermined maximum buffer size of the stream by the predetermined maximum bitrate of the stream.

In still yet another embodiment, also includes encoding the alternative video streams so that each stream in the set of alternative streams has the same aspect ratio.

A still further embodiment again also includes determining a lower bound seek delay for each stream in the set of alternative video streams.

Still another embodiment again also includes including within each stream its lower bound seek delay.

A still further additional embodiment also includes determining the alternative stream that has the highest lower bound seek delay, and including the highest lower bound seek delay within each stream.

In still another additional embodiment, the alternative video streams are encoded in accordance with the H.264 standard.

A yet further embodiment again also involves including the highest lower bound seek delay in a initial_cpb_removal_delay field in an SEI buffering message within each stream.

Yet another embodiment again also includes determining the lower bound seek delay as follows:

$$\text{Delay} = \max \forall \text{ chunks} \left( \frac{\sum_{i=0}^{n} \text{size chunk}_i}{\text{rate}} - (n-1) \cdot \text{duration chunk} \right)$$

4

A yet further additional embodiment includes determining the upper bound seek delay as follows:

$$\text{Delay} = \frac{\text{level buffersize} + \text{level rate} \cdot \text{duration chunk}}{\text{rate}}$$

where level buffersize is the maximum buffer size constraint used in encoding the video stream;
duration chunk is the time taken to playback a single chunk of video;
level rate is the maximum bitrate of the video; and
rate is the network data rate.

A further additional embodiment again includes a machine readable medium containing processor instructions, where execution of the instructions by the processor causes the processor to perform a process including receiving multimedia content, where the multimedia content includes source video data having a primary resolution and a primary sample aspect ratio, and encoding the source video data as a set of alternative video streams, where: the alternative video streams have different maximum bitrates; and the alternative video streams are encoded to have an upper bound seek delay that is equal to or less than the upper bound seek delay of streams in the set of alternative video streams that are encoded at a higher maximum bitrate.

DETAILED DESCRIPTION OF DRAWINGS

Figure 1A:
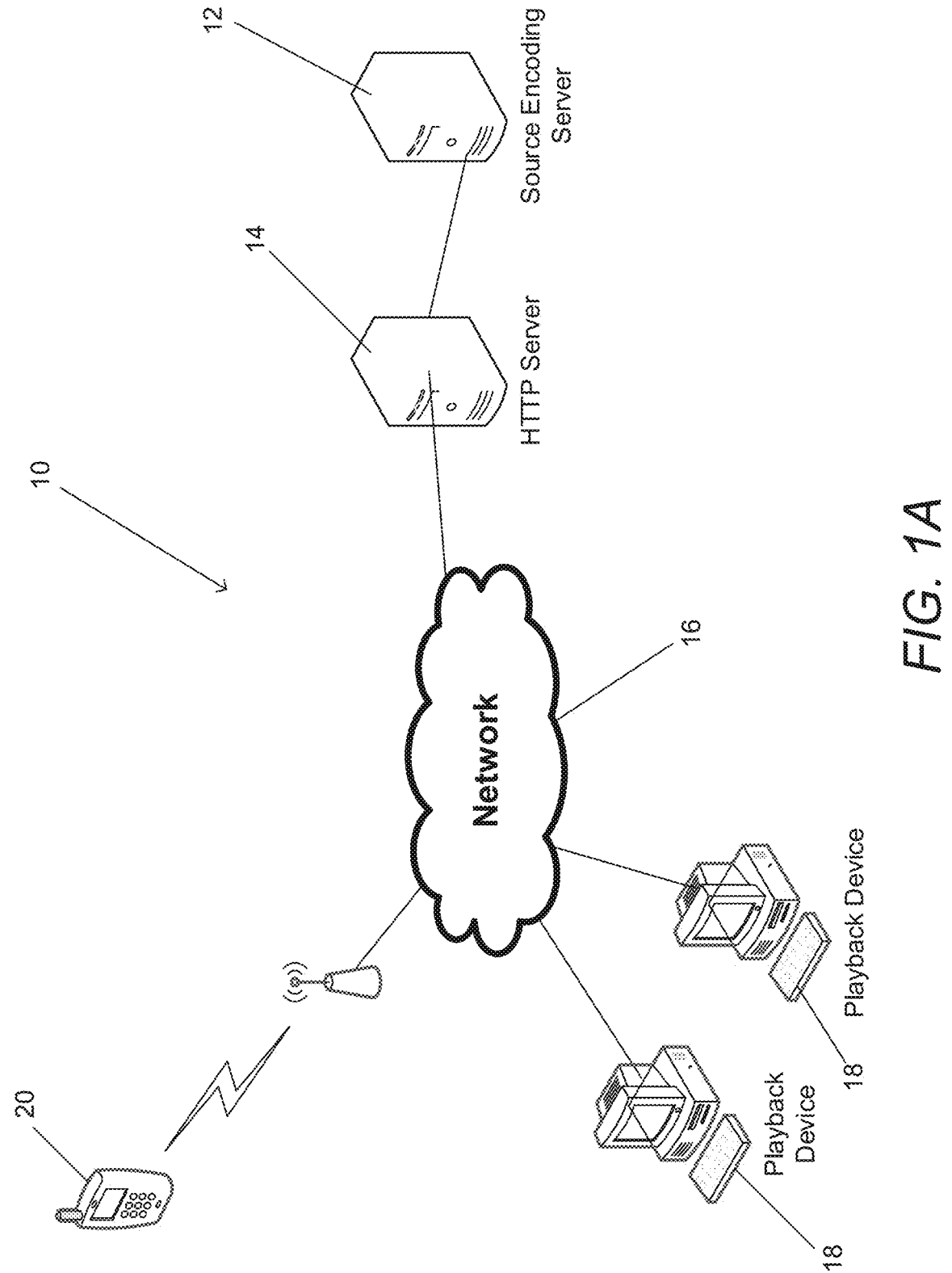
FIG. 1A is an architecture diagram of an adaptive bitrate streaming system in accordance with an embodiment of the invention.

Turning now to the drawings, systems and methods for encoding alternative streams for use in adaptive bitrate streaming based upon the delay of each stream in accordance with embodiments of the invention are illustrated. The delay of a stream is the amount of time media is buffered prior to commencing playback so that underflow does not occur during playback. In several embodiments, an upper bound seek delay can be determined based upon the maximum bitrate and maximum buffer size with which a stream is encoded. In many embodiments, every stream is encoded to have an upper bound seek delay that is equal to or less than the upper bound seek delay of higher bitrate streams. In several embodiments, the upper bound seek delay of a stream is limited based upon a predetermined maximum buffer size that is determined based upon the size of the available buffer on common playback devices. When the streams are encoded according to these constraints, a playback device buffering an amount of media prior to playback having a duration equal to the upper bound seek delay (plus a safety margin) has sufficient time to respond to a reduction in channel data rate so that the playback device can automatically switch to the optimal stream for the new channel conditions.

In a number of embodiments, a lower bound seek delay is determined by analyzing a specific stream and determining a minimum amount of seek delay to prevent underflow. Utilizing the lower bound seek delay can significantly reduce delays when commencing playback of streaming media. However, buffering less media can mean that the playback device has less time to switch to a lower bitrate stream in response to a sudden drop in channel rate. In several embodiments, the playback device responds to a sudden drop in channel rate by selecting the highest bitrate stream for which the lower bound seek delay can be buffered within the playback duration of the currently buffered media at the new channel rate. In many embodiments, safety margins are also utilized in the calculations to accommodate variations that occur in real world systems.

The lower bound seek delay can vary depending upon the point within the stream at which playback commences. In addition, the lower bound seek delay can vary depending upon the rate of each stream. In a number of embodiments, the playback device obtains the lower bound seek delays for all of the streams from the server. In several embodiments, the playback device only obtains the largest of the lower bound seek delays for each stream from the server. When video is encoded in accordance with the H.264 standard developed by the Telecommunication Standardization Sector's Video Coding Experts Group together with the International Organization for Standardization (ISO), International Electro technical Commission (IEC) and Moving Picture Experts Group (MPEG), playback devices in accordance with many embodiments of the invention consider the value of the initial_cpb_removal_delay field in an SEI buffering message within the H.264 stream to be equivalent to the lower bound seek delay. In a number of embodiments, the value in the initial_cpb_removal_delay field in each stream is modified by the adaptive bitrate streaming system to be the maximum lower bound seek delay and/or initial-_cpb_removal_delay value for all of the alternative streams hosted by the server.

In several embodiments, the lower bound seek delay is used by the playback device to determine the amount of media to buffer prior to commencing playback. However, the playback device selects a stream having a maximum bitrate that is significantly below the channel rate so that the buffer quickly reaches the upper bound seek delay for the stream. When the amount of media in the buffer has a playback duration equal to the upper bound seek delay, the playback device can then freely switch to the optimal stream for the channel conditions from that point onward. Adaptive bitrate streaming systems, playback devices, and the buffering and playback of adaptive bitrate streaming media in accordance with embodiments of the invention are discussed further below.

Adaptive Streaming System Architecture

An adaptive bitrate streaming system in accordance with an embodiment of the invention is illustrated in FIG. 1A. The adaptive bitrate streaming system 10 includes a source encoding server 12 configured to encode source media as a number of alternative streams. As is discussed further below, the source encoding server 12 generates a top level index to a plurality of container files containing the encoded streams, at least a plurality of which are alternative streams of encoded video. These files are uploaded to a content server 14. A variety of playback devices 18 can then request portions of the encoded streams from the content server 14 via a network 16 such as the Internet.

In many embodiments, the top level index file is a SMIL file and the media is stored in Matroska container files and playback devices request portions of the files using HTTP or another similar stateless protocol. However, any appropriate index file format and/or container file format can be utilized to store and index encoded streams and any suitable communication protocol can be utilized by playback devices 18 to obtain data from the content server 14 in accordance with embodiments of the invention.

Although a specific architecture is shown in FIG. 1A any of a variety of architectures can be utilized to perform adaptive bitrate streaming in accordance with embodiments of the invention. Source encoders and playback devices in accordance with embodiments of the invention are discussed further below.

Source Encoders

Figure 1B:
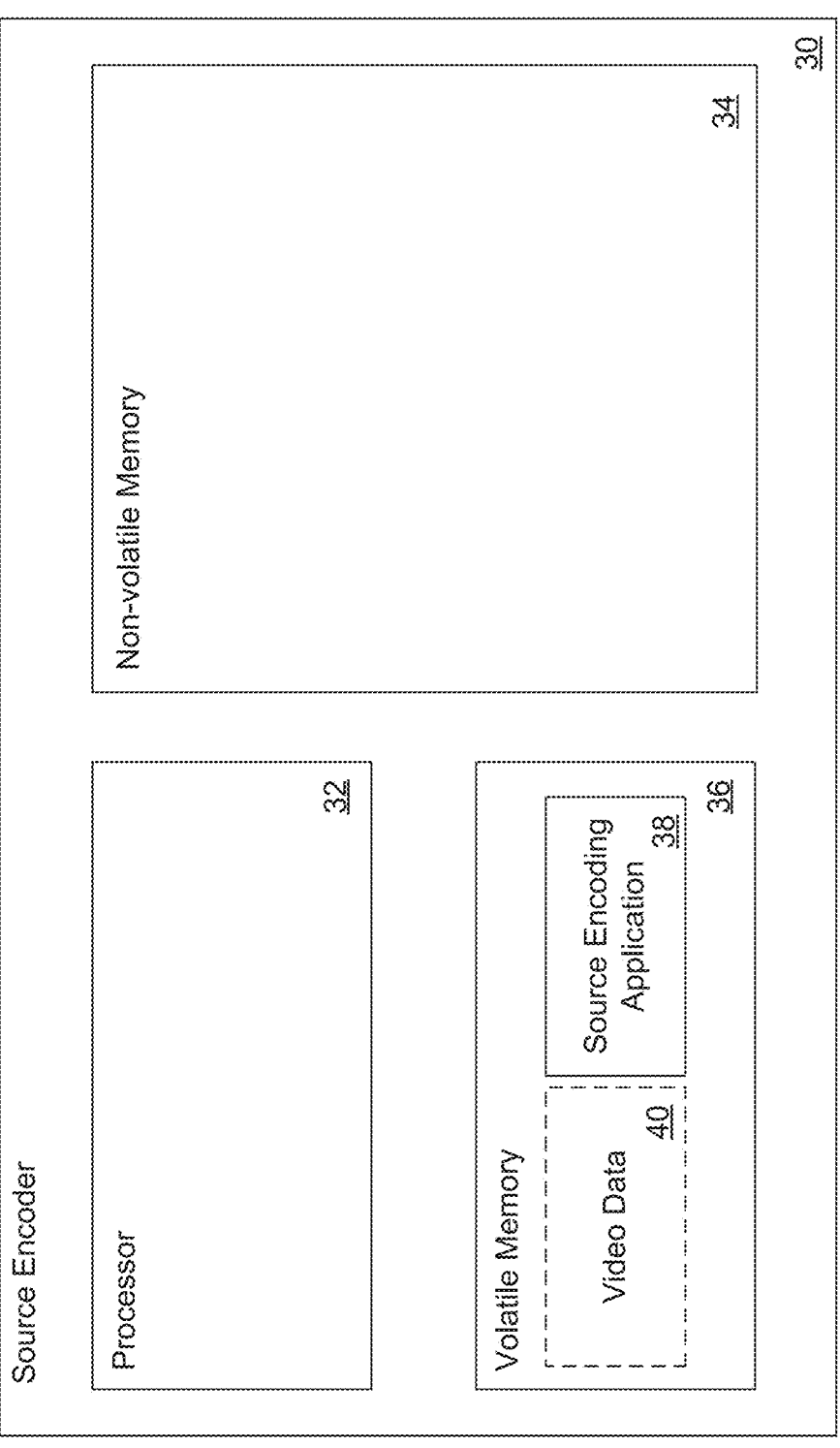
FIG. 1B is an architecture diagram of a source encoder in accordance with an embodiment of the invention.

In the illustrated embodiment, the adaptive bitrate streaming system includes one or more source encoders capable of encoding a source stream of video content into alternative streams of encoded video having different maximum bitrates and where the upper bound seek delays of each of the streams is equal to or less than the upper bound seek delays of any of the other alternative streams encoded at a higher bitrate. In many embodiments, the source encoder can be implemented using any device capable of encoding streams of multimedia, where the streams are encoded at different resolutions, sampling rates, upper bound seek delays and/or maximum bitrates. The basic architecture of an adaptive streaming system source encoder in accordance with an embodiment of the invention is illustrated in FIG. 1B. The adaptive bitrate streaming system 30 includes a processor 32 in communication with non-volatile memory 34 and volatile memory 36. In the illustrated embodiment, the volatile memory includes a source encoding application 38 and alternative streams of video data 40. The source encoding application 38 takes media including a source video stream as an input and encodes the source video as a plurality of alternative streams. In many embodiments, the alternative streams are encoded with different resolutions, sample aspect ratios, and/or maximum bitrates. Due to the differences in the maximum bitrates at which the alternative streams are encoded, a playback device can switch between the alternative streams to perform adaptive bitrate streaming of the encoded source video. As is discussed further below, a playback device can seamlessly down switch between streams when each of the alternative streams is encoded so that its upper bound seek delay is less than the playback duration of the amount of media in the buffer. When the amount of buffered media has a playback duration equal to the upper bound seek delay of any of the other alternative streams encoded at a lower maximum bitrate, then the playback device will seamlessly down switch. As is also discussed below, the lower bound seek delay can also be useful to playback devices in enabling more rapid commencement of playback. In several embodiments, information concerning the upper bound seek delay of a stream and/or the lower bound seek delay of stream can be made available to playback devices by the source encoding application 38 by including the information in a container file containing the stream or by including the information in a top level index file that describes the stream.

In embodiments where the alternative streams of video data are encoded in accordance with the H.264 standard, the source encoding application 38 can write a value indicative of the lower bound seek delay into an initial_cpb_removal_delay field in an SEI buffering message within each alternative H.264 stream. In many embodiments, the source encoding application 38 writes the lower bound seek delay and/or the initial_cpb_removal_delay value of the alternative stream having the highest lower bound seek delay to the initial_cpb_removal_delay field in each of the alternative streams. As is discussed below, the maximum lower bound seek delay is typically sufficient for performing stream switching in accordance with many embodiments of the invention. In other embodiments, any of a variety of mechanism for including lower bound seek delay information in video streams including streams that are encoded in formats other than in accordance with the H.264 standard can be utilized.

Figure 3:
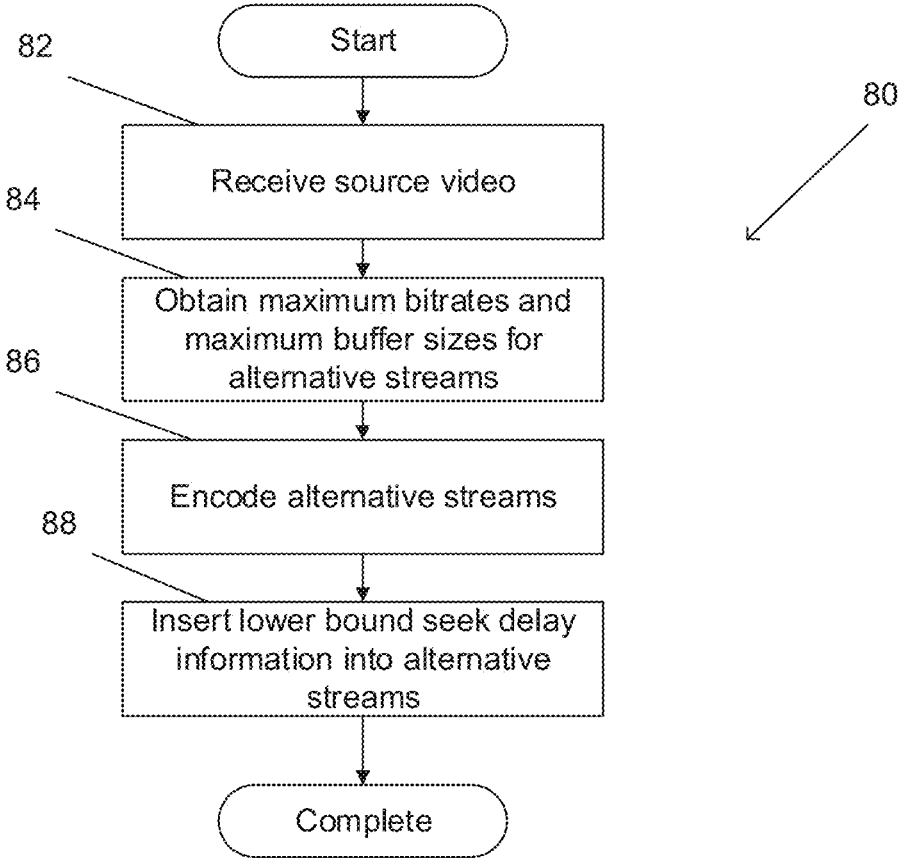
FIG. 3 is a flow chart illustrating a process for encoding alternative streams of video in accordance with an embodiment of the invention.

A process for encoding source video as a plurality of alternative streams in accordance with embodiments of the invention is illustrated in FIG. 3. The process 80 includes receiving (82) source video and obtaining (84) maximum bitrates and maximum buffer sizes for each of the alternative video streams that will be generated by the source encoder. The alternative video streams are then encoded (86) and are typically written to container files. In writing the encoded video streams to container files, the process 80 can also write (88) information concerning lower bound seek delays into each of the alternative streams in a manner similar to that outlined above. In many embodiments, information indicative of the lower bound seek delay of each stream is included with the stream. In several embodiments, the highest lower bound seek delay of all of the streams is included in each of the files.

Although a specific architecture is illustrated in FIG. 1B, any of a variety of architectures including architectures where the application is located on disk or some other form of storage and is loaded into volatile memory at runtime can be utilized to implement source encoders capable of encoding a stream of source video content into alternative streams of encoded video having different maximum bitrates and where the upper bound seek delays of each of the streams is equal to or less than the upper bound seek delays of any of the other alternative streams encoded at a higher bitrate in accordance with embodiments of the invention.

Playback Devices

Figure 1C:
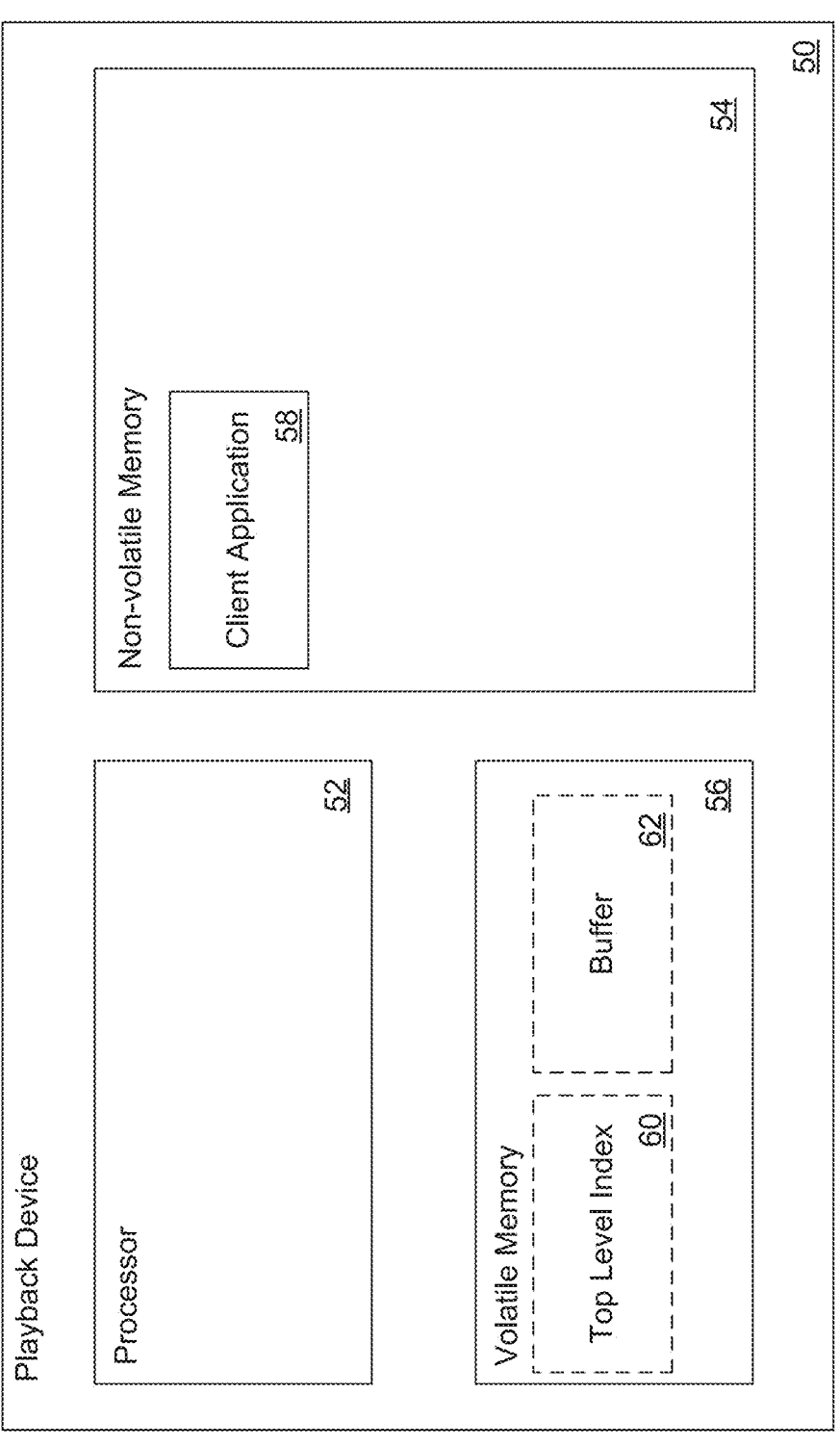
FIG. 1C is an architecture diagram of a playback device in accordance with an embodiment of the invention.

In the system illustrated in FIG. 1A, the playback devices are personal computers, and mobile phones. In other embodiments, playback devices can include consumer electronics devices such as DVD players, Blu-ray players, televisions, set top boxes, video game consoles, tablets, and other devices that are capable of connecting to a server and playing back encoded media. A basic architecture for a playback device in accordance with an embodiment of the invention is illustrated in FIG. 1C. The playback device 50 includes a processor 52 in communication with non-volatile memory 54 and volatile memory 56. In the illustrated embodiment, the non-volatile memory includes a client application 58 that configures the processor and the playback device to stream content from a remote server.

During operation, the client application 58 can configure the playback device to purchase content from a content store and request a top level index file 60 from a content server or another server. When the top level index file 60 is received from the content server, the client application 58 configures the playback device to store the top level index file 60 in memory 56. The client application 58 can then configure the playback device 50 to playback content by using the top level index file to request portions of container files containing content from a content server. The specific container files selected by the client application 58 can be determined based upon the information available to the client application within the top level index file 60. The requested portions of the container files containing content are stored within a buffer 62 in the memory 56 of the playback device. The size of the buffer typically depends upon the video buffer verifier specified for a particular stream in the top level index file 60. Although in many embodiments, the buffer size is fixed or determined based on any number of factors appropriate to a specific application and/or stream(s). The client application can continue to request and playback content from different container files depending upon the prevailing streaming conditions until a user instruction suspending playback is received or until playback completes.

When the network data rate drops, the playback device can determine an appropriate lower bitrate stream based upon the amount of data that can be downloaded from the lower bitrate stream during the time it will take for the client application to playback the content stored within the buffer 62 and the available data rate. Buffer underflow will not occur following the stream switch provided a sufficient amount of data is downloaded. In several embodiments, the client application 58 responds to a sudden drop in channel rate by selecting the highest bitrate stream for which the lower bound seek delay can be buffered within the playback duration of the currently buffered media at the new channel rate. When the playback device has already buffered an amount of video with a playback duration equal to the upper bound seek delay of the stream being played back and the alternative video streams are encoded in the manner outlined above, the playback device can respond to a drop in network data rate by simply selecting the stream that has the highest maximum bitrate less than the new network data rate. In many embodiments, safety margins are also utilized in the calculations to accommodate variations that occur in real world systems. In several embodiments, additional margins are provided to enable the playback device to grow the amount of buffered data to correspond to the upper bound seek delay of the stream. The manner in which playback devices make stream switching decisions in accordance with embodiments of the invention is discussed further below.

Although a specific playback device architecture is illustrated in FIG. 1C, any of a variety of architectures including architectures where the client application is located on disk or some other form of storage and is loaded into volatile memory at runtime can be utilized to implement playback devices for use in adaptive bitrate streaming systems in accordance with embodiments of the invention.

Measuring Channel Data Rate

Transmission of data from a content server to a playback device can be considered to involve a constant rate channel that varies due to external conditions. Playback devices in accordance with embodiments of the invention measure the rate of the channel and then start streaming the encoded stream that has a maximum bitrate closest to and less than the measured rate of the channel (less any safety margin). In a number of embodiments, the playback device measures the rate of the channel by requesting data and measuring the time taken to receive the requested data from the server.

Due to the fact that the buffer of playback device is sometimes full and therefore cannot accept data or requests byte ranges or chunks of data from container files located on the content server, intervals or gaps can occur in which the playback device does not receive any data. In addition, the playback device can simultaneously stream content from multiple streams. For example, a playback device can simultaneously request content from audio, video and subtitle streams. In many embodiments, playback devices record the size, start time and duration of each downloaded chunk from each stream. These records can be utilized to refine bandwidth measurements by determining overlapping chunks that were received during a time interval and any gaps during which no data was received during the time interval. In this way, a playback device in accordance with embodiments of the invention can determine the channel data rate as the sum of the data downloaded during a predetermined time interval divided by the effective interval, which is determined by subtracting the duration of any gaps from the predetermined time interval. In many instances, the chunks requested by a playback device correspond to a closed group of pictures. In several embodiments, source video is encoded into a plurality of alternative streams and each portion of the source video is encoded as a closed group of pictures in each of the alternative streams. By aligning the intra-coded frames in the alternative streams in this way, the playback device can switch between alternative streams at the completion of the playback of a closed group of pictures. Irrespective of the stream selected at the completion of the playback of a closed group of pictures, the next frame of video in the selected stream is an intra-coded frame.

Figure 2:
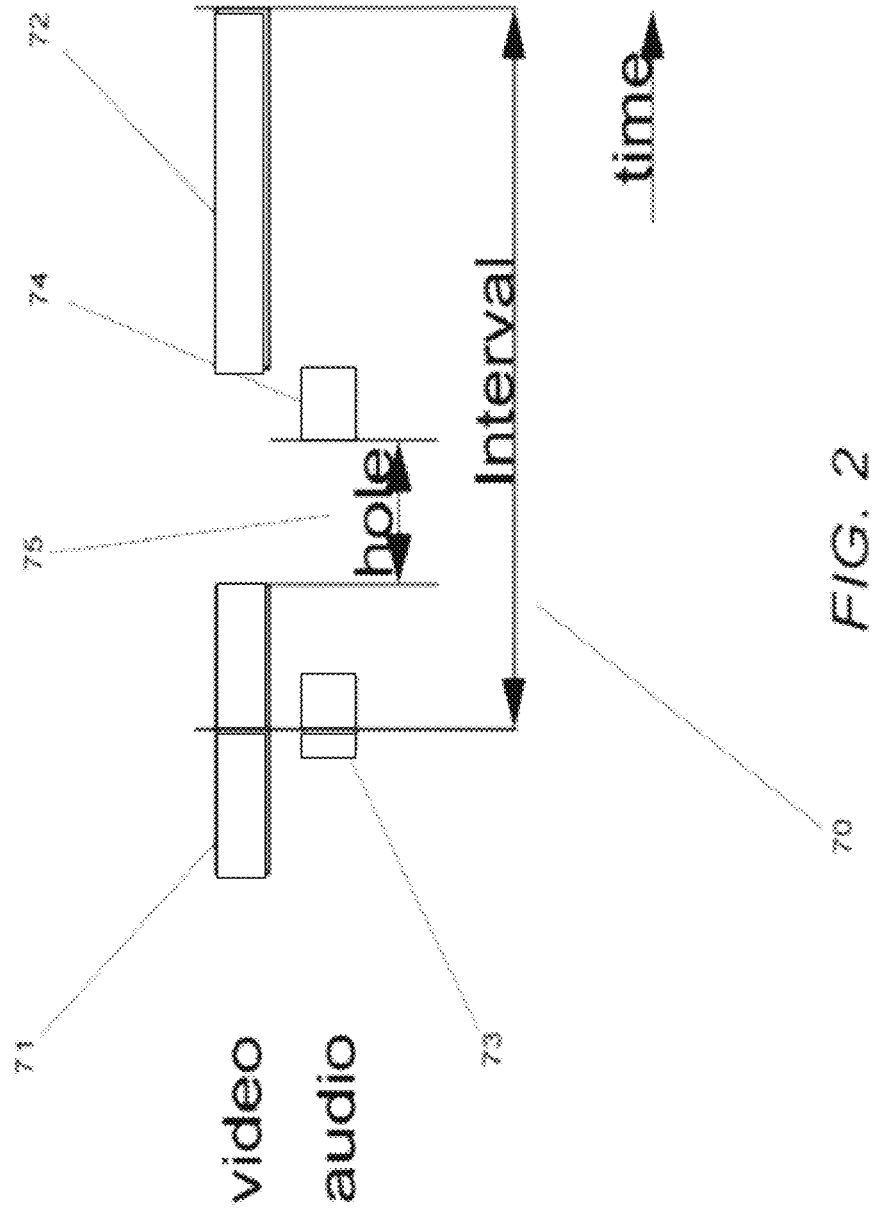
FIG. 2 conceptually illustrates a process for measuring channel data rate in accordance with an embodiment of the invention.

A process utilized to measure channel data rate in accordance with an embodiment of the invention is conceptually illustrated in FIG. 2. In the illustrated embodiment, a predetermined time interval is specified 70 during which data is downloaded from two video chunks 71, 72 and two audio chunks 73, 74. During the predetermined time interval, a gap 75 or hole occurs during which data is not received by the playback device. The channel data rate is calculated as the sum of the bytes of data downloaded during the predetermined time interval 70 from the video chunks 71, 72 and the audio chunks 73, 74 divided by the result of subtracted the duration of the gap 75 from the predetermined time interval. Although a specific process for calculating network data rate is described above, any of a variety of processes appropriate to a specific application can be utilized to determine network data rate in accordance with embodiments of the invention.

Adapting to Changes in Streaming Conditions

As the data rate of a channel changes, the playback device can adapt by selecting the stream that is optimally encoded for the new channel conditions. In several embodiments, each encoded stream is encoded using variable bitrate encoding techniques and the playback devices utilize buffers to smooth the variations in the encoding bitrate. The buffering of media to smooth variations in the encoded bitrate can influence a playback device's decision to switch between streams. When a playback device buffers a sufficiently large amount of data, the playback device has sufficient time to switch between streams and the playback device can choose the highest bitrate stream that has a maximum bitrate, which is less than the new channel rate. When the amount of buffered video has a playback duration that is less than the time required to download a portion of video having a playback duration equal to the upper bound seek delay from a stream having the highest maximum bitrate less than the network data rate, the playback device may select a stream having a lower maximum bitrate to prevent buffer under-flow following the stream switch.

Reducing the amount of data that is initially buffered prior to playback can increase the speed with which playback commences. Buffering less media, however can result in a playback device having less time to switch between streams in the event that the channel rate suddenly decreases. Therefore, a playback device may be forced to select a stream having a bitrate that is lower than would otherwise be the case to avoid underflow. Playback devices in accordance with embodiments of the invention can use either approach or a combination of both approaches. The manner in which playback devices in accordance with embodiments of the invention determine the amount of data to buffer and how to switch streams in response to a sudden decrease in channel rate is discussed further below.

Buffering Variable Bit Rate Streams

The buffering of variable bitrate encoded media prior to the commencement of playback introduces what can be referred to as a buffering or seek delay. The delay is typically equal to the time taken to download a sufficient amount of media that the buffer does not underflow, once playback commences. Assuming channel rate does not change, a playback device should experience uninterrupted playback following the initial seek delay.

Buffering and Playback Using Upper Bound Seek Delay

In many embodiments, each stream is encoded with a maximum bitrate and a maximum buffer size. Therefore, the seek delay for a stream can be determined as the maximum buffer size of the stream divided by the maximum bitrate of the stream. Calculating the seek delay based upon the maximum bitrate of the stream, represents an upper bound on the amount of buffering required to commence playback and can be referred to as the upper bound seek delay. A playback device can safely commence playback of a stream having a maximum bitrate that is less than the channel rate when the playback device has downloaded a portion of media having a duration equal to the upper bound seek delay or a portion of media equal in size to the maximum buffer size attribute of the stream. After playback commences, on average a portion of media corresponding to the duration of the upper bound seek delay remains in the buffer as a result of the encoding of the stream and the rate of the channel.

When the rate of the channel decreases significantly, a playback device in accordance with an embodiment of the invention can switch to a lower bitrate stream (i.e. a stream having a lower maximum bitrate). If the playback device does not buffer a portion of media having a playback duration equal to the upper bound seek delay of the lower bitrate stream prior to completing playback of the previously buffered media, then the playback of the lower bitrate stream may stall. Given that the playback device has buffered a portion of media having a playback duration equal to or greater than the upper bound seek delay, underflow can be avoided if the upper bound seek time of the lower bitrate stream is equal to or less than the upper bound seek delay of the higher bitrate stream. Accordingly, if every stream is encoded to have an upper bound seek delay that is equal to or less than the upper bound seek delay of higher bitrate streams, then the playback device can smoothly transition between streams that are optimal for given channel conditions without regard to seek delay.

Switching Between Streams

Figure 4:
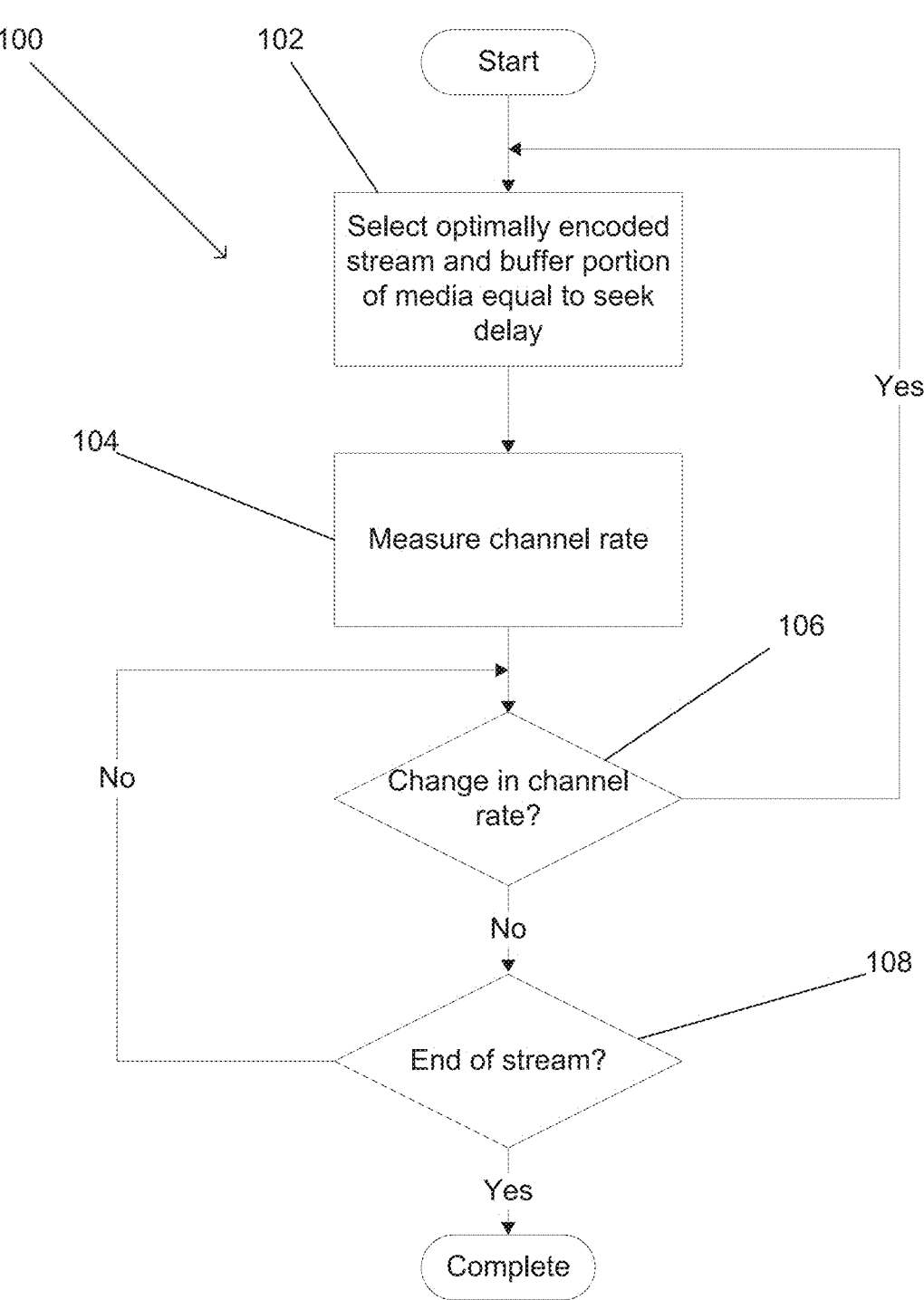
FIG. 4 is a flow chart illustrating a process for switching between streams when the amount of media buffered before commencement of playback is determined using the upper bound seek delay in accordance with an embodiment of the invention.

A process for switching between streams when the amount of media buffered before commencement of playback is determined using the upper bound seek delay is illustrated in FIG. 4. The process 100 includes selecting (102) the optimal stream for the playback conditions and buffering a portion of media having a playback duration equal to the upper bound seek delay prior to playback. Prior to commencement of playback the channel conditions may be unknown, and playback commences at the lowest bitrate (although many embodiments measure the channel rate prior to commencing playback and can utilize bitrate streams having higher maximum bitrates). The playback device then measures (104) the channel data rate and determines (106) whether there has been a change in channel rate. If there has been a change, the playback device chooses (102) the stream that is optimally encoded for the new channel rate. The process repeats until the end of the stream (108) is reached. As can readily be appreciated, the process illustrated in FIG. 4 is extremely simple. The playback device can disregard seek delay due to the encoding of the streams ensuring that lower bit rate streams have an upper bound seek delay equal to or less than the upper bound seek delay of the higher bitrate streams, and due to the playback device buffering a portion of media having a playback duration equal to the upper bound seek delay of the stream. Although a specific process is illustrated in FIG. 4, similar processes appropriate to specific applications can also be utilized in accordance with embodiments of the invention including (but not limited to) processes that utilize lower bounds on seek delay to reduce the time taken to commence playback.

Buffering and Playback Using Lower Bound Seek Delay

When video is encoded at a variable bit rate, all pictures do not have the same size. Depending upon the channel rate, a large frame (e.g. an I-frame) can take more than one frame period to download. Therefore, the clustering of large frames determines the actual minimum seek delay for avoiding stalls in the playback of the video stream at a given channel rate. There is an advantage in knowing the minimum or lower bound seek delay to reduce the time taken to commence streaming and to make stream switching decisions when the amount of data in the buffer is less than the upper bound seek delay. When the amount of data in the buffer is less than the upper bound seek delay and the need to switch streams arises, ideally a stream is selected that has a lower bound seek delay that is smaller than the amount of time it will take to playback the video stored within the buffer. Due to the fact that video data is typically requested in chunks, the lower bound seek delay can be determined based upon the size of the chunks as follows:

$$\text{Delay} = \max \forall \text{ chunks} \left( \frac{\sum_{i=0}^{n} \text{size chunk}_i}{\text{rate}} - (n-1) \cdot \text{duration chunk} \right) \quad (1)$$

Effectively, the lower bound seek delay is determined as the maximum of the difference for each chunk in the time between the chunk arriving (i.e. the sum of size of all preceding chunks and the current chunk n divided by the channel rate) and when it should have arrived to prevent underflow (i.e. (n−1)*playback duration of each chunk) The upper bound seek delay is determined based upon the maximum buffer size of stream of data as follows:

$$\text{Delay} = \frac{\text{level buffersize} + \text{level rate} \cdot \text{duration chunk}}{\text{rate}} \quad (2)$$

The upper bound seek delay is determined to be the time it takes to download the largest possible chunk plus the time taken to playback the chunk. Due to the manner in which variable bit rate video is encoded, the largest possible frame in the stream can theoretically be as large as the buffer size.

Using either equation, a minimum buffer delay for a stream can be determined. While the lower bound seek delay is typically less than the upper bound seek delay, the lower bound seek delay also changes depending upon the point at which playback commences. The lower bound seek delay for each point in each stream can be calculated in advance by a server and provided to the playback device as required. Alternatively, many H.264 bitstreams carry delay information in the SEI buffering message in the field initial_cpb_removal_delay. While this value is not the same as performing the above calculation, it has been found to be equivalent and, in several embodiments, the initial_cpb_removal_delay value at a particular point in the stream is used as the lower bound seek delay at that point.

Playback can typically commence sooner when a playback device uses the lower bound seek delay to determine the amount of buffered media that can prevent underflows. During playback, however, the playback device may have less buffered content than when the upper bound seek delay is used. Therefore, when the channel rate decreases, the playback device has less time to switch to a lower bitrate stream. In many embodiments, the playback device selects a stream having a maximum bitrate that is less than and closest to the new channel rate, and from which a portion of media having a playback duration equal to the lower bound seek delay can be downloaded in the time it will take to playback the remaining buffered media. In many instances, the stream that is optimally encoded for the channel conditions is not the stream selected, because insufficient media can be downloaded in the time it will take to playback the buffered content. Instead, a lower bitrate stream may be selected so that the portion of media downloaded during the playback of the buffered media has a playback duration equal to or greater than the lower bound seek delay for the lower bitrate stream. When a sufficient portion of media has accumulated in the playback device's buffer, the playback device can switch to a higher rate bitstream that is optimal for the channel bitrate.

A playback device utilizing lower bound seek delays when switching between streams in accordance with an embodiment of the invention can obtain the lower bound seek delay for each of the streams from the server. In several embodiments, the lower bound seek delays are encoded in the stream received from the server. In a number of embodiments, the playback device separately obtains the lower bound seek delays from the server. In several embodiments, the playback device utilizes the highest of the lower bound seek delays for each of the streams as the lower bound seek delay for all of the streams. The highest of the lower bound seek delays can be referred to as the safe seek delay, because it is safe for the playback device to use with respect to all of the streams. Utilizing the safe seek delay instead of the lower bound seek delays for each stream can be desirable as knowing the safe seek delay of the current stream gives sufficient knowledge over the seek delay of all other alternative streams. In many embodiments, the maximum initial_cpb_removal_delay value across all corresponding locations in the streams is considered to be the safe seek delay and is inserted in the initial_cpb_removal_delay field in the SEI buffering message of each stream. In other embodiments, any of a variety of techniques is utilized to provide the playback device with the delay associated with each of the streams in advance of the playback device selecting a new stream in response to a change in channel rate.

Buffering and Playback Using a Combination of Lower and Upper Bound Seek Delay

Utilizing lower bound seek times enables playback to commence more rapidly. Using upper bound seek times in combination with appropriately encoded content simplifies switching between streams. In a number of embodiments, playback devices utilize processes that harness the benefits of both approaches.

Figure 5:
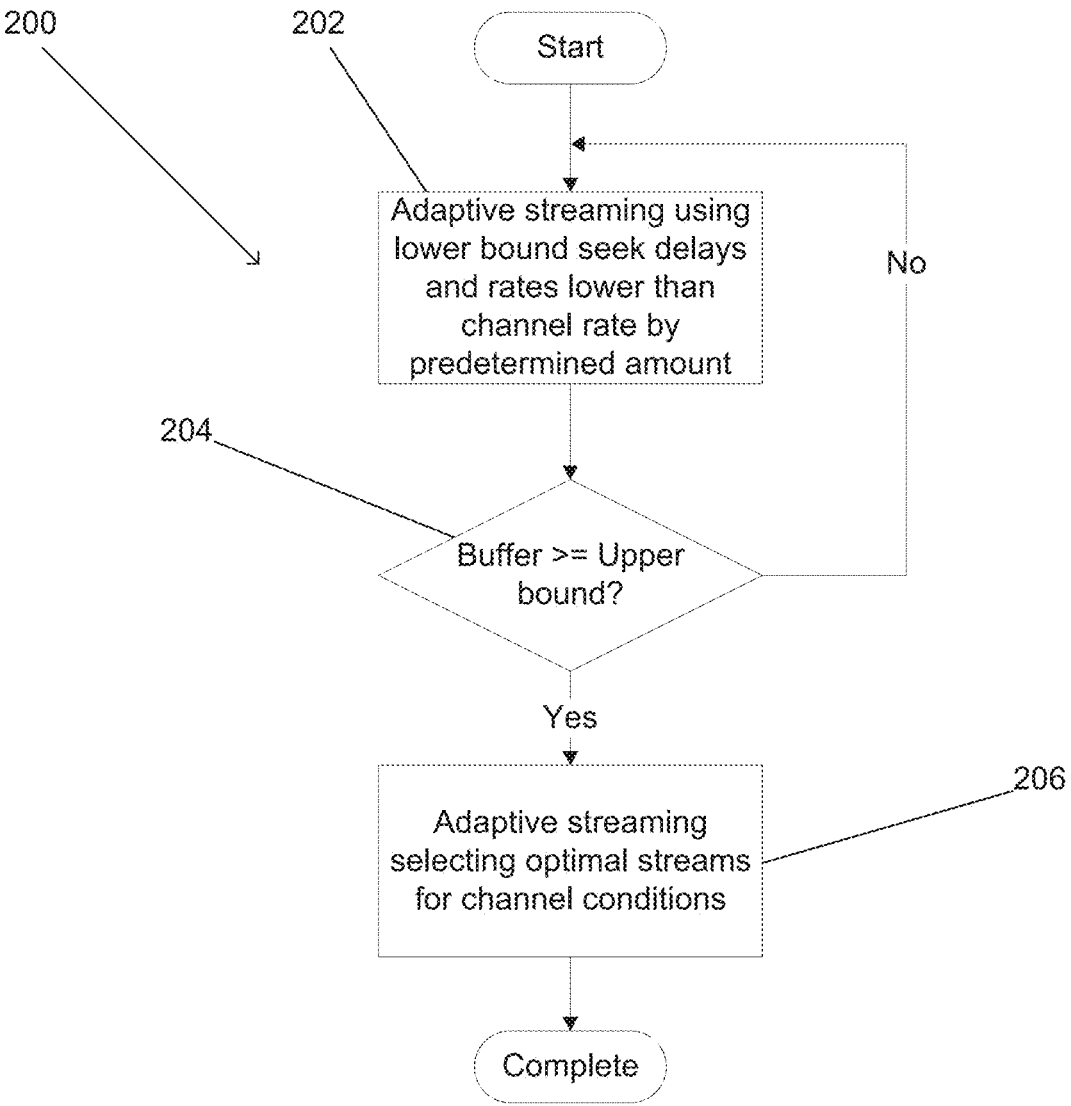
FIG. 5 illustrates a process for performing adaptive bitrate streaming in accordance with an embodiment of the invention.

A process for performing adaptive bitrate streaming in accordance with an embodiment of the invention is illustrated in FIG. 5. The process 200 assumes that the streams are encoded in a similar manner to the streams described above with respect to the process shown in FIG. 4 and that lower bound seek delay or safe seek delay information is available to the playback device (e.g. within each stream). The process 200 commences in a similar manner to the adaptive bitrate streaming process described above that utilizes a lower bound seek delay or a safe seek delay to determine when to commence playback. The adaptive bitrate process differs with respect to the process described above, however, in that the rates of the streams selected during the initial adaptive bitrate process (202) are a predetermined amount less than the channel rate. Lower bitrate streams are selected so that media accumulates in the playback device's buffer. In a number of embodiments, a stream is selected having a bitrate that is 33% less than the channel rate. Although in other embodiments the predetermined amount can be greater, less, and/or determined in other ways that result in the accumulation of media in the buffer of the playback device during media playback. When the amount of media accumulated in the buffer is determined (204) to have a playback duration greater than or equal to the upper bound seek delay of the stream and/or a size greater than or equal to the maximum buffer size for the encoded stream, the adaptive bitrate streaming process transitions (206) to the adaptive bitrate streaming process illustrated in FIG. 4 in which the combination of the encoding of the streams and the amount of media stored in the playback device's buffer enables the playback device to select the optimally encoded stream for a given channel rate without regard to seek delay.

Although a specific process is illustrated in FIG. 5 and specific stream switching rules are discussed above combining the benefits of lower bound seek times to achieve rapid playback and the simplicity of upper bound seek times when switching streams, a number of processes can utilize varying buffering requirements during adaptive bitrate streaming to achieve different performance objectives in accordance with embodiments of the invention.

Stream Switching when Using a Combination of Lower and Upper Bound Seek Delay

When a playback device can utilize both lower and upper bound seek delays, sets of stream switching rules are utilized that are dependent upon the amount of buffered video. As discussed above with respect to FIG. 5, a playback device can utilize lower bound seek delays to reduce the time spent buffering prior to commencing playback of video. During this initial start up period, a stream switching rule can be applied that involves selecting a stream where the lower bound seek delay of the stream is less than the amount of time it will take to playback the video buffered at the time of the stream switch. Such a rule can be expressed as follows:

1. If (buffer level<upper bound seek delay) then select a stream having a lower bound seek delay that is less than the playback duration of the buffered video.

In the event that a network bandwidth measurement cannot be reliably made, a playback device can utilize an additional streaming rule that forces the selection of the lowest bitrate stream. This stream switching rule can be expressed as follows:

2. If (buffer level<upper bound seek delay and network data rate is unreliable or inaccurate) then select the lowest bitrate stream.

When a steady network data rate is experienced for a long enough period of time or a lower bitrate stream is selected to grow the buffer in the manner described above with respect to FIG. 5, then the amount of video buffered by the playback device will climb to the point where it exceeds the upper bound seek delay of the stream. At which point, stream switching can be performed based upon the measured network bandwidth and the maximum bitrate of the streams. Where the upper bound seek delay of streams encoded at a lower maximum bitrate are known, a similar stream switching decision could be made based upon the upper bound seek delay of the stream to which the switch is being made. The corresponding stream switching rule can be expressed as follows:

3. If (network data rate is reliable and upper bound seek delay<=buffered video), then select the stream having a maximum bitrate that is the highest of the alternative streams that have a maximum bitrate less than the network data rate.

When the playback device is downloading chunks of a stream much faster than expected according to the level rate, then the channel data rate is much higher than the maximum bitrate of the stream and it is difficult to reliably measure the network data rate so a higher bitrate stream can be selected once the amount of video buffered exceeds the upper bound seek delay. This stream switching rule can be expressed as follows:

4. If (expected time to download chunk>>actual time taken to download chunk and upper bound seek delay<=buffered video), then select the stream having the next highest maximum bitrate.

In addition to the above rules, playback devices in accordance with embodiments of the invention can incorporate hysteresis in the stream switching rules to prevent excessive switching of levels when the measured network data rate oscillates around a decision threshold. Furthermore, a playback device may include safety margins or headroom between the measured network data rate and the maximum bitrate of a selected stream when selecting streams. In many embodiments, the headroom can be temporarily increased after a significant bandwidth drop (e.g. a predetermined amount or percentage) to reduce the likelihood of buffer underflow in the event of an additional drop in network data rate. Also, the playback device can throttle the downloading of other media (particularly at start up) to reduce the time taken for the playback duration of the buffered video data for a particular stream to match or exceed the upper bound seek delay.

Although specific stream switching rules are discussed above combining the benefits of lower bound seek times to achieve rapid playback and the simplicity of upper bound seek times when switching streams, any of a variety and combination of stream switching rules can be utilized during adaptive bitrate streaming to achieve different performance objectives in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A method of performing adaptive bitrate streaming of media including a set of alternative video streams, comprising:

requesting, by a playback device, portions of alternative streams of encoded video via a network based upon a plurality of sets of stream switching conditions, where each of the alternative streams of encoded video is encoded using variable bitrate encoding and having a different maximum bitrate;

buffering the requested portions of the alternative streams of encoded video in a buffer on the playback device;

measuring network data rate using the playback device;

playing back encoded video from the portions of the alternative streams of encoded video stored in the buffer on the playback device;

utilizing, by the playback device, a plurality of sets of stream switching rules in a manner dependent upon a playback duration of encoded video stored in the buffer on the playback device;

utilizing, by the playback device, a first of the plurality of sets of stream switching rules when the playback duration of encoded video stored in the buffer is greater than or equal to a first threshold;

utilizing, by the playback device, a second of the plurality of sets of stream switching rules when the playback duration of encoded video stored in the buffer is less than the first threshold;

wherein the first of the plurality of sets of stream switching rules comprises selecting a stream from the alternative streams of encoded video based upon specified maximum bitrates for the alternative streams of encoded video and a network data rate measurement, wherein the selected stream has a highest maximum bitrate that is less than the network data rate.

2. The method of claim 1, further comprising commencing playback when the playback duration of encoded video stored in the buffer is greater than a minimum buffering delay.

3. The method of claim 1, further comprising utilizing, by the playback device, a third of the plurality of sets of stream switching rules when the playback duration of encoded video stored in the buffer is less than a second threshold, where the second threshold has a smaller amount of buffered video than the first threshold.

4. The method of claim 1, further comprising utilizing the plurality of sets of stream switching rules in a manner that incorporates hysteresis in the plurality of sets of stream switching rules.

5. The method of claim 1, wherein a stream switching rule in the second of the plurality of stream switching rules is based upon multiple measurements of network data rate measured by the playback device over a period of time.

6. The method of claim 1, wherein at least one set of stream switching rules in the plurality of sets of stream switching rules is a single stream switching rule.

7. The method of claim 1, further comprising performing adaptive bitrate streaming using an index file.

8. The method of claim 1, further comprising determining:

the second threshold based upon a lower bound seek delay of one of the alternative streams of video and a margin; and the first threshold based upon an upper bound seek delay of one of the alternative streams of video and a margin.

9. The method of claim 1, wherein at least one of the second threshold and the first threshold are fixed.

10. The method of claim 1, wherein the stream selected from the alternative streams of encoded video in accordance with the first of the plurality of sets of stream switching rules has a lower maximum bitrate than another stream from the alternative streams of encoded video that has an average bitrate that is less than the network data rate measurement.

11. The method of claim 10, wherein the stream from the alternative streams of encoded video has an average bitrate that is lower than the network data rate measurement.

12. The method of claim 1, further comprising measuring network data rate using at least one selected from the group consisting of:

requesting data and measuring a time taken to receive the requested data; and determining a sum of data downloaded during a predetermined time interval divided by an effective interval, where the effective interval is determined by subtracting a duration of one or more gaps from the predetermined time interval.

13. The method of claim 1, wherein the first threshold is based upon a time required to download a portion of video from one of the alternative streams of encoded video.

14. The method of claim 1, wherein the second of the plurality of sets of stream switching rules comprises selecting a stream from the set of alternative streams of encoded video wherein a time required to download a portion video from the stream is less than the playback duration of encoded video stored in the buffer.

15. A method of performing adaptive bitrate streaming of media including a set of alternative video streams, comprising:

requesting, by a playback device, portions of alternative streams of encoded video via a network based upon a plurality of sets of stream switching conditions, where each of the alternative streams of encoded video is encoded using variable bitrate encoding and having a different maximum bitrate;

buffering the requested portions of the alternative streams of encoded video in a buffer on the playback device;

measuring network data rate using the playback device;

playing back encoded video from the portions of the alternative streams of encoded video stored in the buffer on the playback device, wherein the playback commences when a playback duration of encoded video stored in the buffer is greater than a minimum buffering delay;

utilizing, by the playback device, a plurality of sets of stream switching rules in a manner dependent upon a playback duration of encoded video stored in the buffer on the playback device;

utilizing, by the playback device, a first of the plurality of sets of stream switching rules when the playback duration of encoded video stored in the buffer is greater than or equal to an upper threshold;

utilizing, by the playback device, a second of the plurality of sets of stream switching rules and when the playback duration of encoded video stored in the buffer is lower than the upper threshold and greater than or equal to a lower threshold;

utilizing, by the playback device, a third of the plurality of sets of stream switching rules when the playback duration of encoded video stored in the buffer is less than a lower threshold, wherein the lower threshold and the upper threshold are fixed;

wherein the first of the plurality of sets of stream switching rules comprises selecting a stream from the alternative streams of encoded video based upon specified maximum bitrates for the alternative streams of encoded video and a network data rate measurement, wherein the selected stream has a highest maximum bitrate that is less than the network data rate; and wherein a stream switching rule in the second of the plurality of stream switching rules is based upon multiple measurements of network data rate over a period of time.

16. The method of claim 15, wherein the first of the plurality of sets of stream switching rules comprises selecting a stream from the alternative streams of encoded video based upon specified maximum bitrates for the alternative streams of encoded video and a network data rate measurement.

17. The method of claim 15, further comprising utilizing the plurality of sets of stream switching rules in a manner that incorporates hysteresis in the plurality of sets of stream switching rules.

18. The method of claim 15, further comprising performing adaptive bitrate streaming using an index file.

19. The method of claim 15, further comprising determining:

the lower threshold based upon a lower bound seek delay of one of the alternative streams of video and a margin; and the upper threshold based upon an upper bound seek delay of one of the alternative streams of video and a margin.

20. The method of claim 15, wherein the stream selected from the alternative streams of encoded video in accordance with the first of the plurality of sets of stream switching rules has a lower maximum bitrate than another stream from the alternative streams of encoded video that has an average bitrate that is less than the network data rate measurement.

21. The method of claim 15, wherein the stream from the alternative streams of encoded video has an average bitrate that is lower than the network data rate measurement.

22. The method of claim 15, further comprising measuring network data rate using at least one selected from the group consisting of:

requesting data and measuring a time taken to receive the requested data; and determining a sum of data downloaded during a predetermined time interval divided by an effective interval, where the effective interval is determined by subtracting a duration of one or more gaps from the predetermined time interval.

23. The method of claim 15, wherein the first threshold is based upon a time required to download a portion of video from one of the alternative streams of encoded video.

24. The method of claim 15, wherein the second of the plurality of sets of stream switching rules comprises selecting a stream from the set of alternative streams of encoded video wherein a time required to download a portion video from the stream is less than the playback duration of encoded video stored in the buffer.

25. A method of performing adaptive bitrate streaming of media including a set of alternative video streams, comprising:

requesting, by a playback device, portions of alternative streams of encoded video via a network based upon a plurality of sets of stream switching conditions, where each of the alternative streams of encoded video is encoded using variable bitrate encoding and having a different maximum bitrate;

buffering the requested portions of the alternative streams of encoded video in a buffer on the playback device;

measuring network data rate using the playback device;

playing back encoded video from the portions of the alternative streams of encoded video stored in the buffer on the playback device, wherein the playback commences when a playback duration of encoded video stored in the buffer is greater than a minimum buffering delay;

utilizing, by the playback device, a plurality of sets of stream switching rules in a manner dependent upon a playback duration of encoded video stored in the buffer on the playback device;

utilizing, by the playback device, a first of the plurality of sets of stream switching rules when the playback duration of encoded video stored in the buffer is greater than or equal to an upper threshold;

utilizing, by the playback device, a second of the plurality of sets of stream switching rules and when the playback duration of encoded video stored in the buffer is lower than the upper threshold and greater than or equal to a lower threshold;

wherein the first of the plurality of sets of stream switching rules comprises selecting a stream from the alternative streams of encoded video based upon specified maximum bitrates for the alternative streams of encoded video and a network data rate measurement, wherein the selected stream has a highest maximum bitrate that is less than the network data rate, wherein the lower threshold and the upper threshold are fixed, and wherein a stream switching rule in the second of the plurality of stream switching rules is based upon multiple measurements of network data rate over a period of time.

26. The method of claim 25, further comprising utilizing, by the playback device, a third of the plurality of sets of stream switching rules when the playback duration of encoded video stored in the buffer is less than a lower threshold.

27. The method of claim 25, further comprising utilizing the plurality of sets of stream switching rules in a manner that incorporates hysteresis in the plurality of sets of stream switching rules.

28. The method of claim 25, further comprising performing adaptive bitrate streaming using an index file.

29. The method of claim 25, further comprising determining:

the lower threshold based upon a lower bound seek delay of one of the alternative streams of video and a margin; and the upper threshold based upon an upper bound seek delay of one of the alternative streams of video and a margin.

30. The method of claim 25, wherein the stream selected from the alternative streams of encoded video in accordance with the first of the plurality of sets of stream switching rules has a lower maximum bitrate than another stream from the alternative streams of encoded video that has an average bitrate that is less than the network data rate measurement.

31. The method of claim 25, wherein the stream from the alternative streams of encoded video has an average bitrate that is lower than the network data rate measurement.

32. The method of claim 25, further comprising measuring network data rate using at least one selected from the group consisting of:

requesting data and measuring a time taken to receive the requested data; and determining a sum of data downloaded during a predetermined time interval divided by an effective interval, where the effective interval is determined by subtracting a duration of one or more gaps from the predetermined time interval.

33. The method of claim 25, wherein the first threshold is based upon a time required to download a portion of video from one of the alternative streams of encoded video.

34. The method of claim 25, wherein the second of the plurality of sets of stream switching rules comprises selecting a stream from the set of alternative streams of encoded video wherein a time required to download a portion video from the stream is less than the playback duration of encoded video stored in the buffer.

* * * * *